United States Patent
Caldwell et al.

(10) Patent No.: US 9,976,641 B2
(45) Date of Patent: May 22, 2018

(54) HYDRAULIC TRANSMISSION

(71) Applicant: Artemis Intelligent Power Limited, Midlothian (GB)

(72) Inventors: Niall Caldwell, Midlothian (GB); Daniel Abrahams, Midlothian (GB); Daniil Dumnov, Midlothian (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 301 days.

(21) Appl. No.: 15/022,397

(22) PCT Filed: Feb. 25, 2014

(86) PCT No.: PCT/GB2014/050566
§ 371 (c)(1),
(2) Date: Mar. 16, 2016

(87) PCT Pub. No.: WO2015/040360
PCT Pub. Date: Mar. 26, 2015

(65) Prior Publication Data
US 2016/0208898 A1    Jul. 21, 2016

(30) Foreign Application Priority Data
Sep. 18, 2013 (EP) .................... 13185050

(51) Int. Cl.
*F16D 31/02* (2006.01)
*F16H 39/16* (2006.01)
(Continued)

(52) U.S. Cl.
CPC ............. *F16H 39/16* (2013.01); *F03C 1/045* (2013.01); *F03C 1/0447* (2013.01); *F03C 1/053* (2013.01);
(Continued)

(58) Field of Classification Search
CPC .... F04B 1/063; F04B 11/0075; F04B 49/065; F04B 49/22; F03C 1/045; F03C 1/0681; F16H 61/4183
See application file for complete search history.

(56) References Cited

U.S. PATENT DOCUMENTS 5,190,446 A * 3/1993 Salter ................... F04B 49/065
                                                         417/297
6,651,545 B2 * 11/2003 Nippert ................. F04B 49/121
                                                         417/270
(Continued)

FOREIGN PATENT DOCUMENTS

CN      103035807         4/2013
DE   102010044697 A1      3/2012
(Continued)

OTHER PUBLICATIONS

International Search Report for corresponding International PCT Application No. PCT/GB2014/050566, dated May 30, 2014.
(Continued)

*Primary Examiner* — Michael Leslie
(74) *Attorney, Agent, or Firm* — Hauptman Ham, LLP

(57) ABSTRACT

A hydraulic transmission comprising a variable displacement pump and motor, at least one having cylinders having valves which are controllable on each cycle of cylinder working volume to determine the net displacement of working fluid by the cylinder. The transmission has a valve control module which determines a displacement of the pump and the motor by specifying a displacement demand. The pump and/or motor valve control module determine the frequency of intensity peaks in the frequency spectrum of the pattern of cylinders carrying out active and inactive cycles of cylinder working volume using a first procedure and, if these will fall within disallowed frequency bands including the resonant frequency of components with which (Continued)

the transmission is in mechanical communication, the displacement demand, or another input, is periodically modified to suppress generation of those frequencies. The hydraulic transmission is useful for example in a wind turbine generator, or a vehicle.

18 Claims, 18 Drawing Sheets

(51) Int. Cl.
    *F04B 49/06*     (2006.01)
    *F04B 49/22*     (2006.01)
    *F03D 7/02*     (2006.01)
    *F04B 1/053*     (2006.01)
    *F04B 1/06*     (2006.01)
    *F04B 11/00*     (2006.01)
    *F04B 17/02*     (2006.01)
    *F03C 1/40*     (2006.01)
    *F03C 1/053*     (2006.01)
    *F16H 61/4183*     (2010.01)
    *F03D 15/00*     (2016.01)
    *F03D 9/28*     (2016.01)
    *F16H 61/431*     (2010.01)

(52) U.S. Cl.
CPC .......... *F03C 1/0531* (2013.01); *F03D 7/0296* (2013.01); *F03D 9/28* (2016.05); *F03D 15/00* (2016.05); *F04B 1/053* (2013.01); *F04B 1/0531* (2013.01); *F04B 1/06* (2013.01); *F04B 1/063* (2013.01); *F04B 11/00* (2013.01); *F04B 11/0075* (2013.01); *F04B 17/02* (2013.01); *F04B 49/065* (2013.01); *F04B 49/22* (2013.01); *F16H 61/4183* (2013.01); *F05B 2260/406* (2013.01); *F16H 61/431* (2013.01); *Y02E 10/722* (2013.01); *Y02E 10/723* (2013.01); *Y02P 80/158* (2015.11)

(56) References Cited

U.S. PATENT DOCUMENTS

| | | | | |
|---|---|---|---|---|
| 8,197,223 | B2* | 6/2012 | Kuttler | F04B 49/06 417/505 |
| 9,010,104 | B2* | 4/2015 | Rampen | F04B 49/22 60/459 |
| 9,200,648 | B2* | 12/2015 | Lumkes | F04B 7/02 |
| 2012/0023918 | A1 | 2/2012 | Laird | |
| 2012/0059523 | A1 | 3/2012 | Salter | |
| 2012/0076670 | A1 | 3/2012 | Rampen | |
| 2013/0221676 | A1 | 8/2013 | Caldwell | |
| 2016/0208898 | A1 | 7/2016 | Caldwell et al. | |

FOREIGN PATENT DOCUMENTS

| | | |
|---|---|---|
| EP | 2 623 779 | 8/2013 |
| JP | 2013-155694 | 8/2013 |
| WO | 2012023918 | 2/2012 |
| WO | 2013/114437 A1 | 8/2013 |

OTHER PUBLICATIONS

Rampen, W.H.S., et al., "Constant pressure control of the Digital Displacement Hydraulic Piston Pump," Fourth Bath International Fluid Power Workshop Bath, Sep. 1991.

* cited by examiner

Fig. 6

| Time step | Threshold | Sum % | Active Cylinders | Accumulator | Cylinder Activation |
|---|---|---|---|---|---|
| 0.1 | 100 | 25 | 0 | 25 | Inactive |
| 0.2 | 100 | 50 | 0 | 50 | Inactive |
| 0.3 | 100 | 75 | 0 | 75 | Inactive |
| 0.4 | 100 | 100 | 1 | 0 | Active - Normal |
| 0.5 | 100 | 25 | 0 | 25 | Inactive |
| 0.6 | 100 | 50 | 0 | 50 | Inactive |
| 0.7 | 100 | 75 | 0 | 75 | Inactive |
| 0.8 | 100 | 100 | 1 | 0 | Active - Normal |
| 0.9 | 100 | 25 | 0 | 25 | Inactive |
| 1 | 100 | 50 | 0 | 50 | Inactive |
| 1.1 | 100 | 75 | 0 | 75 | Inactive |
| 1.2 | 100 | 100 | 1 | 0 | Active - Normal |
| 1.3 | 100 | 25 | 0 | 25 | Inactive |
| 1.4 | 100 | 50 | 0 | 50 | Inactive |
| 1.5 | 100 | 75 | 0 | 75 | Inactive |
| 1.6 | 100 | 100 | 1 | 0 | Active - Normal |
| 1.7 | 100 | 25 | 0 | 25 | Inactive |
| 1.8 | 100 | 50 | 0 | 50 | Inactive |
| 1.9 | 100 | 75 | 0 | 75 | Inactive |
| 2 | 100 | 100 | 1 | 0 | Active - Normal |
| 2.1 | 100 | 25 | 0 | 25 | Inactive |
| 2.2 | 100 | 50 | 0 | 50 | Inactive |
| 2.3 | 100 | 75 | 0 | 75 | Inactive |
| 2.4 | 100 | 100 | 1 | 0 | Active - Normal |
| 2.5 | 100 | 25 | 0 | 25 | Inactive |
| 2.6 | 100 | 50 | 0 | 50 | Inactive |
| 2.7 | 100 | 75 | 0 | 75 | Inactive |
| 2.8 | 100 | 100 | 1 | 0 | Active - Normal |
| 2.9 | 100 | 25 | 0 | 25 | Inactive |
| 3 | 100 | 50 | 0 | 50 | Inactive |
| 3.1 | 100 | 75 | 0 | 75 | Inactive |
| 3.2 | 100 | 100 | 1 | 0 | Active - Normal |
| 3.3 | 100 | 25 | 0 | 25 | Inactive |

Fig. 14

| Time step | Pulse generator output | Threshold | Sum % | Active Cylinders | Accumulator | Cylinder Activation |
|---|---|---|---|---|---|---|
| 0.1 | 0 | 100 | 25 | 0 | 25 | Inactive |
| 0.2 | 0 | 100 | 50 | 0 | 50 | Inactive |
| 0.3 | 0 | 100 | 75 | 0 | 75 | Inactive |
| 0.4 | 0 | 100 | 100 | 1 | 0 | Active - Normal |
| 0.5 | 20 | 120 | 25 | 0 | 25 | Inactive |
| 0.6 | 20 | 120 | 50 | 0 | 50 | Inactive |
| 0.7 | 20 | 120 | 75 | 0 | 75 | Inactive |
| 0.8 | 20 | 120 | 100 | 0 | 100 | Inactive |
| 0.9 | 0 | 100 | 125 | 1 | 25 | Active - Retarded |
| 1 | 0 | 100 | 50 | 0 | 50 | Inactive |
| 1.1 | 0 | 100 | 75 | 0 | 75 | Inactive |
| 1.2 | 0 | 100 | 100 | 1 | 0 | Active - Advanced |
| 1.3 | 20 | 120 | 25 | 0 | 25 | Inactive |
| 1.4 | 20 | 120 | 50 | 0 | 50 | Inactive |
| 1.5 | 20 | 120 | 75 | 0 | 75 | Inactive |
| 1.6 | 20 | 120 | 100 | 0 | 100 | Inactive |
| 1.7 | 0 | 100 | 125 | 1 | 25 | Active - Retarded |
| 1.8 | 0 | 100 | 50 | 0 | 50 | Inactive |
| 1.9 | 0 | 100 | 75 | 0 | 75 | Inactive |
| 2 | 0 | 100 | 100 | 1 | 0 | Active - Advanced |
| 2.1 | 20 | 120 | 25 | 0 | 25 | Inactive |
| 2.2 | 20 | 120 | 50 | 0 | 50 | Inactive |
| 2.3 | 20 | 120 | 75 | 0 | 75 | Inactive |
| 2.4 | 20 | 120 | 100 | 0 | 1 | Inactive |
| 2.5 | 0 | 100 | 125 | 1 | 25 | Active - Retarded |
| 2.6 | 0 | 100 | 50 | 0 | 50 | Inactive |
| 2.7 | 0 | 100 | 75 | 0 | 75 | Inactive |
| 2.8 | 0 | 100 | 100 | 1 | 0 | Active - Advanced |
| 2.9 | 20 | 120 | 25 | 0 | 25 | Inactive |
| 3 | 20 | 120 | 50 | 0 | 50 | Inactive |
| 3.1 | 20 | 120 | 75 | 0 | 75 | Inactive |
| 3.2 | 20 | 120 | 100 | 0 | 100 | Inactive |
| 3.3 | 0 | 100 | 125 | 1 | 25 | Active - Retarded |

HYDRAULIC TRANSMISSION

FIELD OF THE INVENTION

The invention relates to the field of hydraulic transmissions comprising variable displacement hydraulic pumps and motors having electronically controlled valves which can be controlled to determine whether each cylinder carries out an active cycle or an inactive cycle on each cycle of cylinder working volume, and machines including such hydraulic transmissions.

BACKGROUND TO THE INVENTION

It is known to use a hydraulic transmission with a variable displacement hydraulic pump and a variable displacement hydraulic motor in apparatus such as wind turbine generators and vehicles. For example, in the case of a wind turbine generator, a variable displacement hydraulic pump may be driven by a drive shaft connected to a rotor which is driven by the wind, and one or more variable displacement hydraulic motors may be connected to one or more electrical generators, and driven by pressurised working fluid from the output of the hydraulic pump. In the case of a vehicle, an internal construction engine or battery may drive the hydraulic pump and a hydraulic motor may drive each wheel, or other actuator.

Suitable variable displacement hydraulic pumps and motors include those which comprise a rotating shaft and a plurality of cylinders of cyclically varying working volume, in which the displacement of working fluid through each cylinder is regulated by electronically controllable valves, on each cycle of cylinder working volume, and in phased relationship to cycles of cylinder working volume, to determine the net throughput of working fluid by the machine. For example, EP 0361927 disclosed a method of controlling the net throughput of working fluid through a multi-cylinder pump by opening and/or closing electronically controllable valves, in phased relationship to cycles of cylinder working volume, to regulate fluid communication between individual cylinders of the pump and a low pressure working fluid line. As a result, individual cylinders are selectable by a valve control module, on each cycle of cylinder working volume, to either displace a predetermined fixed volume of working fluid (an active cycle), or to undergo an inactive cycle (also referred to as an idle cycle) in which there is no net displacement of working fluid, thereby enabling the net throughput of the pump to be matched dynamically to demand. EP 0494236 developed this principle and included electronically controllable poppet valves, which regulate fluid communication between individual cylinders and a high pressure working fluid line, thereby facilitating the provision of a hydraulic motor (which in some embodiments may function as a pump or a motor in alternative operating modes). EP 1537333 introduced the possibility of active cycles in which only part of the maximum displacement of an individual cylinder was selected.

Wind turbine generators, vehicles, or other machines including hydraulic transmissions, may be damaged by resonant oscillations arising from the operation of the machine including resonant oscillations arising from the operation of the hydraulic transmission. For example, EP 2146093 discloses a method and arrangement for damping oscillation in the tower of a wind turbine generator by controlling a power offset signal. U.S. Pat. No. 7,309,930 discloses a vibration damping system and method in which oscillations of the turbine tower are damped by controlling the torque produced by the generator. EP 1719910 discloses a method of actively damping vibrations in a wind turbine tower in which the pitch angle of the wind turbine blades is controlled.

However, it has been found that when employing hydraulic pumps and motors of the type described above, vibrations may arise, resulting from the pulsatile nature of the flow through the hydraulic pump, or motor, which may lead to oscillations if they coincide with a resonant frequency of one or more components. Vibrations may arise which are dependent on the frequency with which active cycles are selected. For example, if ten active cycles are selected per second, spaced equally apart in time, vibrations may arise at 10 Hz. Similarly, problems may also arise from vibrations associated with the frequency of inactive cycles of cylinder working volume. For example, if 90% of cylinders undertake an active cycle and one cylinder per second carries out an inactive cycle, spaced equally apart in time, there may be a vibration of 10 Hz, as a result. Such vibrations can be more damaging, simply because they become relevant when the pump or motor is operating at a high proportion of maximum displacement, and therefore in circumstances where there is a high power throughput, and greater forces are acting.

It is difficult to avoid resonances arising from these vibrations because of the wide range of conditions under which wind turbine generators and other machines may operate, and the complex factors which determine what vibrations may be generated by hydraulic pumps or motors of the above type.

SUMMARY OF THE INVENTION

According to a first aspect of the present invention there is provided a hydraulic pump or motor comprising:
a rotatable shaft,
a shaft sensor which measures the position or speed of rotation of the rotatable shaft,
at least one cam having at least one lobe,
a plurality of cylinders having working volumes which vary cyclically with rotation of the rotatable shaft,
   a low pressure working fluid line and a high pressure working fluid line, a plurality of valves regulating the flow of working fluid between each cylinder and the low and high pressure working fluid lines, at least one said valve associated with each cylinder being an electronically controlled valve,
   wherein the hydraulic pump or motor comprises a valve control module configured to generate command signals to actively control the said electronically controlled valves in phased relationship to cycles of cylinder working volume, to thereby determine whether each cylinder carries out an active cycle in which there is a net displacement of working fluid or an inactive cycle in which there is no net displacement of working fluid, for each cycle of cylinder volume,
   the valve control module having a demand input which receives a displacement demand signal representative of a target net displacement of working fluid by the plurality of cylinders,
   wherein the valve control module is configured to generate said command signals so that the time averaged net displacement of the plurality of cylinders meets the displacement demand represented by the displacement demand signal, while selecting the pattern of command signals so that the frequency of one or more intensity peaks of the frequency spectrum of the pattern of active and inactive cycles of cylinder working volume carried out by the cylinders does not remain within one or more ranges of undesirable frequencies, taking into account the speed of rotation of the rotatable shaft.

Typically, the one or more ranges of undesirable frequencies comprise one or more resonant frequencies of a portion of a machine, which is part of or in mechanical communication with (e.g. mechanically coupled to) the hydraulic transmission, which resonant frequency does not vary proportionately to the speed of rotation of the rotatable shaft. (The portion of a machine may be formed from one or more components).

The phenomenon of resonance of the portion of the machine as a result of excitation by the hydraulic transmission is thereby avoided. The portion may be part of (e.g. one or more components of) the hydraulic transmission (for example, a drive shaft connected to the hydraulic pump or the hydraulic motor) or may be one or more components which is in mechanical communication with (e.g. mechanically coupled to the hydraulic transmission), for example, a blade or the tower of a wind turbine generator housing the hydraulic transmission.

It may be the one or more of the resonant frequencies (and therefore ranges of undesirable frequencies) do not vary with the speed of rotation of the rotatable shaft. However, it may be that one or more of the resonant frequencies (and therefore ranges of undesirable frequencies) vary with the speed of rotation of the rotatable shaft, but not proportionately to the speed of rotation of the rotatable shaft. For example, the stiffness of the blades of a wind turbine generator, and therefore the frequency of one or more modes of resonance of the blades, increases with the speed of rotation of the rotatable shaft of the pump to which they are coupled, but not linearly. One or more of the resonant frequencies (and therefore ranges of undesirable frequencies) may vary dependent on a parameter, which may be independent of the speed of rotation of the rotatable shaft. For example, one or more said resonant frequencies may depend on the position of a ram or boom. For example, resonant frequencies of a ram may depend on the position of the ram. Fluid oscillation between two accumulators in a hydraulic line may vary with the pressure in the hydraulic line. In some cases, one or more resonant frequencies may depend on more than one parameter, some or all of which may be independent of the speed of rotation of the rotatable shaft, for example, a machine having two rams might have modes of resonance at frequencies which depend on the position of each ram. The one or more parameters may be measured parameters measured by one or more sensors.

In some embodiments, the resonant frequency of one or more oscillations can be determined by analysing a signal (e.g. the pressure in the high pressure line, the speed of rotation of the rotatable shaft, the signal from a sensor attached to a potentially resonating portion of the machine, such as an accelerometer or strain gauge) to identify one or more oscillations (e.g. by frequency analysis) and the resonant frequency of the one or more oscillations, and by then setting one or more ranges of undesirable frequencies to include the determined one or more frequencies.

The hydraulic pump or motor may further comprise a resonance determining module which is operable to determine one or more of the ranges of undesirable frequencies. The valve control module may therefore comprise or receive data concerning one or more of the ranges of undesirable frequencies from the resonance determining module. The resonance determining module may determine one or more of the ranges of undesirable frequencies in dependent on one or more measured parameters. The resonance determining module may determine one or more of the ranges of undesirable frequencies in dependent on one or more measured parameters which are independent of the speed of rotation of the rotatable shaft. The resonance determining module may process data from one or more said sensors (which may measure one or more said measured parameters). The resonance determining module may receive the speed of rotation of the rotatable shaft as an input. The resonance determining module may carrying out said analysing of a signal to identify a resonance.

Due to the periodicity of cycles of cylinder working volume, the pattern of active and inactive cycles of cylinder working volume carried out by the cylinders, can result in resonant vibrations in mechanical components which are part of or in mechanical communication with (e.g. mechanically coupled to) the hydraulic pump or motor. The pattern of active and inactive cycles carried out by the cylinders is determined by the pattern of command signals and so the valve control module determines the pattern of active and inactive cycles by determining the pattern of control signals, nevertheless, it is the pulsatile flow or torque arising from the pattern of active and inactive cycles which generates resonant vibrations.

The pattern of active and inactive cycles of cylinder working volume carried out by the cylinders has a frequency spectrum with one or more intensity peaks. For example, if the cylinders carried out active and inactive cycles alternately, there would be an intensity peak at a frequency equal to half of the frequency of cycles of cylinder working volume. More generally, the cylinders will undergo a more complex pattern of active and inactive cycles, having a frequency spectrum with one or more intensity peaks.

The inventors have recognised that the frequency of these intensity peaks varies not only with the sequence of the active and inactive cycles (i.e. the order in which active and inactive cycles take place) but with the speed of rotation of the rotatable shaft. For example, if the rotatable shaft speeds up by x %, the frequency of cycles of cylinder working volume will increase by x % and the frequency of some or all intensity peaks will increase by x %. Accordingly, the frequency of some or all of the intensity peaks is proportional to speed of rotation of the rotatable shaft.

The invention enables the suppression of undesirable vibrations with intensity peaks at resonant frequencies of components which are part of or in mechanical communication with (e.g. mechanically coupled to) the hydraulic pump or motor (for example, resonant frequencies of turbine blades or a turbine tower in embodiments where the hydraulic transmission is incorporated into a wind turbine generator). Advantageously, although the pattern of active and inactive cycles of cylinder working volume is modified as a result of the invention, when the pattern would otherwise generate undesirable resonances, the time averaged net displacement is not modified, which enables the valve control module to be used in place of known valve control modules. Accordingly, the frequency spectrum of the pattern of active and inactive cycles of cylinder working volume of the hydraulic pump or motor for at least some values of the demand signal will be seen to have attenuated components in frequency bands which remain generally the same despite variation in the speed of rotation of the rotatable shaft. In some embodiments, one or more of the attenuated components will be in a frequency band which does vary with the speed of rotation of the rotatable shaft, but not proportionally to the speed of rotation of the rotatable shaft.

It may be that the said the frequency of one or more said intensity peaks is at the fundamental frequency of cylinders carrying out active cycles, or a harmonic thereof, or the fundamental frequency of cylinders carrying out inactive cycles, or a harmonic thereof.

By the fundamental frequency of cylinders carrying out active cycles we refer to the time averaged frequency (cylinders per second) with which the number of cylinders which are carrying out an active cycle varies. By the fundamental frequency of cylinders carrying out inactive cycles (cylinders per second) we refer to the time averaged frequency with which the number of cylinders carrying out an inactive cycle varies. As each cylinder is caused to undertake either active cycles or inactive cycles on each cycle of cylinder working volume, the fundamental frequency of cylinders carrying out active cycles and the fundamental frequency of cylinders carrying out inactive cycles sum to a constant.

If each cylinder operates at a different phase, then the constant typically equals the frequency of cycles of cylinder working volume multiplied by the number of cylinders. However, if this is not the case and a number of cylinders operate at substantially the same phase throughout cycles of cylinder working volume, then the constant will be less. For example, if the cylinders are operated in groups of C cylinders which have substantially the same phase throughout cycles of cylinder working volume, then the said constant will equal the frequency of cycles of working chamber volume multiplied by the number of cylinders divided by C.

It is the frequency with which the number of cylinders carrying out active (or inactive, as appropriate) cycles varies which is important. If the number of cylinders carrying out active (or inactive as appropriate) cycles was changed by a constant amount, that does not affect the fundamental frequency. For example, if at successive decision points as to whether one or more cylinders should undergo active or inactive cycles, it is determined that 0, 0, 0, 1, 0, 0, 0, 1 cylinders will undergo an active cycle then the fundamental frequencies are not affected by determining that 1, 1, 1, 2, 1, 1, 1, 2 cylinders will undergo an active cycle.

The frequency of cylinders carrying out active or inactive cycles is proportional to the speed of rotation of the rotatable shaft (revolutions per second). This is because there will typically be one point during each cycle of cylinder working volume where a given cylinder is committed to either carry out an active cycle or an inactive cycle. For example, a decision is typically made whether or not to close an electronically controlled valve regulating the flow of working fluid between a cylinder and the low pressure working fluid line.

Accordingly, the invention recognises that the hydraulic pump or motor will generate vibrations having intensity peaks at frequencies which depend on the pattern of active and inactive cycles carried out by the cylinders and which, for a given sequence of active and inactive cycles, is proportional to the speed of rotation of the rotatable shaft. According to the invention, the pattern of valve command signals is controlled to reduce unwanted vibrations while delivering the target net displacement of hydraulic fluid, averaged over time. The pattern of valve command signals typically affects the frequency of the one or more intensity peaks of the frequency spectrum by determining whether each cylinder undergoes active or inactive cycles but if the amount of hydraulic fluid displaced by cylinders varies from between cycles then the net displacement determined by the pattern of valve control signals during each cycle of cylinder working volume also affect the frequency of the one or more intensity peaks.

In some embodiments, it is permitted for the frequency of one or more said intensity peaks to remain within one or more ranges of undesirable frequencies for a restricted period of time, for example, for less than 100 rotations of the rotatable shaft or less than 10 rotations of the rotatable shaft. This is because undesirable resonant vibrations typically take some time to build up and increase in amplitude.

The valve control module may be configured to execute a displacement determination algorithm at each of a plurality of time steps to process the displacement demand and the net displacement of working fluid during previous cycles of cylinder working volume and to cause at least one said cylinder to undergo an active cycle in which it makes a net displacement of working fluid when the difference between the total amount of working fluid which has been displaced and the total amount of working fluid which has been demanded, exceeds a threshold.

It may be that the valve control module is configured to reduce the intensity of one or more components of the frequency spectrum while meeting the displacement demand by advancing and/or retarding the selection of cylinders to undergo an active or inactive cycle in comparison to the selection of cylinders to undergo an active cycle or inactive cycle respectively when the frequency of the one or more intensity peaks of the frequency spectrum is not within the one or more ranges of undesirable frequencies.

It may therefore be that the valve control module is configured to select different patterns of active and inactive cycles of cylinder working volume at the same displacement, as a proportion of maximum displacement per revolution of the rotatable shaft, depending on the speed of rotation of the rotatable shaft, to thereby reduce the generation of vibrations at one or more undesirable frequencies.

The valve control module may be configured to vary the threshold to thereby reduce the intensity of one or more undesirable frequency components of the pattern of active and inactive cycles of the one or more said cylinders.

Typically, the threshold is varied only when it is determined that at least one said intensity peak of the frequency spectrum would otherwise fall within one or more said ranges of undesirable frequencies.

The ranges of undesirable frequencies are each typically a range of frequencies extending above and below the frequency of a resonance maxima.

The threshold may be varied responsive to the speed of rotation of the rotatable shaft and the displacement demand signal meeting predefined criteria (selected so that when those criteria are met, it would be expected that the frequency of at least one said intensity peak of the frequency spectrum will fall within at least one of the said ranges of undesirable frequencies).

It may be that the threshold is alternately raised and lowered to reduce the intensity of the frequency spectrum in one or more said ranges of undesirable frequencies.

It may be that the threshold is alternately raised and lowered at a frequency between half and one tenth of the frequency of decisions as to whether a cylinder should undergo an active cycle in which it makes a net displacement of working fluid.

It may be that the threshold is alternately raised and lowered at a frequency between half and one tenth of the frequency of an undesirable frequency within a said range of undesirable frequencies within which at least one intensity peak of the frequency spectrum would otherwise fall. It may be that the threshold is alternately raised and lowered at a frequency between half and one tenth of the frequency of a frequency at the middle of a said range of undesirable frequencies within which at least one intensity peak of the frequency spectrum would otherwise fall.

It may be that the displacement demand signal received by the valve control module is selectively modulated so that the frequency of one or more said intensity peaks of the frequency spectrum does not remain within one or more said ranges of undesirable frequencies.

It may be that the displacement demand signal is selectively modulated by a periodic modulation waveform.

The periodic modulation waveform is typically a square wave. The periodic modulation waveform may have a duty cycle of 50%. The modulation has the effect of avoiding the displacement demand processed by the displacement determination algorithm remaining at a value which would lead to the frequency of one or more intensity peaks of the frequency spectrum falling in one or more of the said ranges of undesirable frequencies. Typically the periodic modulation waveform is summed with the displacement demand signal. Typically, the periodic modulation wave form has a mean amplitude of zero so that it does not change the time averaged mean displacement. The displacement demand could be multiplied by a periodic waveform having a geometric mean of unity.

It may be that the displacement demand signal is selectively modified to remain outside a range of values of the displacement demand signal which would lead to the frequency of one or more intensity peaks of said frequency spectrum being within a range of undesirable frequencies (taking into account the speed of rotation of the rotatable shaft), while still having a time averaged (mean) value which is substantially the same as the received (unmodified) displacement demand signal. The selectively modified displacement demand signal may alternate between first and second values with a duty cycle selected such that the mean value is substantially the same the received (unmodified) displacement demand signal. The first and second values are typically displacement demands at (or above) the upper end (or above) and at (or below) the lower end of the said range of values of the displacement demand signal. The said range of values of the displacement demand signal depends on the range of undesirable frequencies and the speed of rotation of the rotatable shaft.

The selective modulation typically takes place responsive to determination that, without the selective modulation, one or more intensity peaks of the said frequency spectrum would fall within one or more said ranges of undesirable frequencies. The selective modulation may take place responsive to the speed of rotation of the rotatable shaft and the displacement demand signal meeting predefined criteria (selected so that when those criteria are met, it would be expected that the frequency of at least one said intensity peak of the said frequency spectrum would fall within at least one of the said ranges of undesirable frequencies).

It may be that the valve control module comprises an accumulator which stores an accumulated displacement error value and an adder which at each time step adds the displacement demand represented by the displacement demand signal to the accumulated displacement error value and a subtractor which subtracts a value representative of the amount of working fluid which has been displaced under the active control of the valve control module on the same or the previous time step.

Whether the amount of working fluid which has been displaced on the same or the previous time step is subtracted is an implementation option depending when the time step is considered to have completed. Accordingly, the accumulated displacement error value represents the difference between the total amount of working fluid which has been displaced and the total amount of working fluid which has been demanded.

Alternatively, it would be possible for the valve control module to integrate the values of the demanded displacement and the determined displacement and to consider whether the difference between the two exceeds the threshold.

It may be that the valve control module comprises a frequency determination module which determines the frequency of one or more intensity peaks of the frequency spectrum of the pattern of active and inactive cycles carried out by the cylinders which would be generated if the valve control module selected the pattern of active and inactive cycles of cylinder working volume using a first procedure, taking into account the displacement demand and the speed of rotation of the rotatable shaft, and compares the determined one or more frequencies with one or more ranges of undesirable frequencies, and if at least one determined frequency falls within at least one range of undesirable frequencies, normally causes the pattern of active and inactive cycles of cylinder working volume to be selected using a second procedure instead of the first procedure, thereby reducing the intensity of the said frequency spectrum in at least one said range of frequencies. The frequency of one or more intensity peaks of the frequency spectrum of the pattern of active and inactive cycles carried out by the cylinders may be calculated by a method comprising the step of calculating the frequency of active cycles, or the frequency of inactive cycles, or harmonics thereof. (The second procedure typically being one which generates a pattern of active and inactive cycles of cylinder working volume with a reduced intensity of components of the frequency spectrum within the at least on said range of frequencies).

The first procedure may comprise execution of an algorithm which selects a pattern of active and inactive cycles of cylinder working volume to most closely match net displacement or working fluid to the displacement demand, optionally taking into account whether or not cylinders are available to displace working fluid. The first procedure may be a procedure in which all active cycles which are selected displace the same amount of working fluid (e.g. the maximum displaceable amount of working fluid). The second procedure may comprise execution of a different algorithm. The second procedure may comprise modifying an input to, output from , or parameter of the said algorithm.

The valve control module may determine the frequency of one or more intensity peaks of the patterns of active and inactive cycles carried out by the cylinders, taking into account the displacement demand and the speed of rotation of the rotatable shaft. It may be that the displacement demand and the speed of rotation of the rotatable shaft are the only two continuously varying variables taken into account in determining the frequency of one or more intensity peaks. The valve control module may determine the frequency of one or more intensity peaks of the patterns of active and inactive cycles carried out by the cylinders by calculating the fundamental frequency of cylinders carrying out active cycles and/or one or more harmonic thereof, and/or the fundamental frequency of cylinders carrying out inactive cycles, or harmonics thereof and/or one or more harmonics thereof.

The rotatable shaft speed which is taken into account is typically a measured speed of rotation of the rotatable shaft (which may, for example by measured by the shaft sensor, or obtained by processing data received from the shaft sensor).

However, rotatable shaft speed may for example be calculated, or controlled to have a certain value.

It may be that the valve control module receives a rotatable shaft speed signal and takes into account the rotatable shaft speed signal when determining whether the threshold should be varied. It may be that the valve control module receives a rotatable shaft speed signal and is configured to take into account the rotatable shaft speed signal to determine the current frequency of decisions as to whether a cylinder should undergo an active or an inactive cycle and to thereby determine whether the threshold should be varied.

It may be that at least some of the range of undesirable frequencies include frequencies corresponding to frequencies of maximum resonance of one or more components of the hydraulic transmission or which are part of a machine including the hydraulic transmission.

For example, the fluid working machine may be part of a wind turbine generator having one or more blades and a tower, and at least some of the ranges of frequencies may comprise (for example, are centred on) frequencies of maximum resonance of the blades and/or the tower.

It may be that at least one of the one or more ranges of undesirable frequencies may correspond to frequencies of maximum resonance of a rotatable shaft to which the cylinders are coupled and which drives or is driven by the displacement of working fluid by the one or more cylinders.

By "in mechanical communication with" as well as mechanically coupled or connected to we include coupled to the hydraulic pump or motor through a hydraulic circuit (including coupled to through a hydraulic circuit and an actuator).

By the terms hydraulic pump and hydraulic motor we include a hydraulic ram (when acting as a source or sink of pressurised hydraulic fluid respectively).

The invention extends in a second aspect to a hydraulic transmission comprising
- a variable displacement hydraulic pump,
- a variable displacement hydraulic motor,
- a drive shaft coupled to the hydraulic pump, for driving the hydraulic pump, and
- an output shaft coupled to the hydraulic motor, for coupling to a load, wherein at least one of the hydraulic pump and the hydraulic motor is a hydraulic pump or motor according to the first aspect of the invention:

The invention extends to a wind turbine generator comprising the hydraulic transmission. The wind turbine generator may comprise a turbine coupled to the hydraulic pump and comprising a plurality of blades, and an electricity generator coupled to the hydraulic motor.

It may be that one or more said ranges of undesirable frequencies include one or more of: a resonant frequency of the blades, a resonant frequency of the turbine, a resonant frequency of a tower of the wind turbine generator, and a resonant frequency of a drive shaft connecting the turbine to the hydraulic pump.

The hydraulic transmission may comprise a transmission controller. The transmission controller may comprise or be in electronic communication with a resonant frequency determining module which is operable to determine one or more of the ranges of undesirable frequencies. Further features of the resonant frequency determining module and other optional features of the second aspect of the invention correspond to the features described above in relation to the first aspect of the invention.

The invention also extends to a machine comprising a hydraulic transmission according to the second aspect of the invention, and a mechanical structure which is moveable in driven or driving relationship with the hydraulic motor or the hydraulic pump, and wherein one or more of the ranges of undesirable frequencies comprises one or more resonant frequencies of the mechanical structure. One or more said resonant frequencies of the mechanical structure (and ranges of undesirable frequencies) may vary dependent on the configuration of the mechanical structure, for example, in dependence on the movement of the mechanical structure which is in driven or driving relationship with the hydraulic motor or the hydraulic pump. The said configuration may be measured with one or more sensors. The mechanical structure may be the boom of an excavator, the lift mechanism of a fork lift truck or the telescopic arm of an aerial lift.

The invention also extends to a vehicle comprising a hydraulic transmission according to the second aspect of the invention, an engine coupled to the hydraulic pump, and an actuator (such as a wheel) coupled to the hydraulic motor. In this case, one or more of the ranges of undesirable frequencies may comprise resonant frequencies of one or more of the vehicle drivetrain, the vehicle suspension, the steering, the engine, the body of the vehicle, the chassis of the vehicle, or actuated devices such as a boom, excavator arm etc.

The hydraulic pump or motor may be a fluid working machine which functions as a pump but not as a motor. The hydraulic pump or motor may be a fluid working machine which functions as a motor but not as a pump. The hydraulic pump or motor may be a fluid working machine which is operable as either a pump or a motor in alternative operating modes.

The invention extends in a third aspect to a method of operating a hydraulic pump or motor, the hydraulic pump or motor comprising:
- a rotatable shaft,
- a shaft sensor which measures the position or speed of rotation of the rotatable shaft,
- at least one cam having at least one lobe,
- a plurality of cylinders having working volumes which vary cyclically with rotation of the rotatable shaft,
- a low pressure working fluid line and a high pressure working fluid line, a plurality of valves regulating the flow of working fluid between each cylinder and the low and high pressure working fluid lines, at least one said valve associated with each cylinder being an electronically controlled valve, the method comprising receiving a displacement demand signal representative of a target displacement of working fluid by the plurality of cylinders, and generating command signals to actively control the said electronically controlled valves in phased relationship to cycles of cylinder working volume, to thereby determine whether each cylinder carries out an active cycle in which there is a net displacement of working fluid or an inactive cycle in which there is no net displacement of working fluid, for each cycle of cylinder volume, wherein the command signals are selected so that the time averaged net displacement of the plurality of cylinders meets the displacement demand represented by the displacement demand signal, while the pattern of command signals is selected so that the frequency of one or more intensity peaks of the frequency spectrum of the pattern of active and inactive cycles carried out by the cylinders does not remain within one or more ranges of undesirable frequencies, taking into account the speed of rotation of the rotatable shaft.

It may be that the frequency of one or more said intensity peaks to remain within one or more ranges of undesirable frequencies for a restricted period of time, for example, for less than 100 rotations of the rotatable shaft or less than 10 rotations of the rotatable shaft.

The method may comprise determining one or more of the ranges of undesirable frequencies. It may be that one or more of the resonant frequencies (and therefore ranges of undesirable frequencies) does not vary with the speed of rotation of the rotatable shaft. It may be that one or more of the resonant frequencies (and therefore ranges of undesirable frequencies) vary with the speed of rotation of the rotatable shaft, but not proportionately to the speed of rotation of the rotatable shaft.

The method may comprise measuring one or more parameters which determine one or more of the resonant frequencies (for example, using one or more sensors) and thereby determining one or more of the ranges of undesirable frequencies. One or more (or all) of the parameters may be independent of the speed of rotation of the rotatable shaft.

The method may comprise analysing a signal (e.g. the pressure in the high pressure line, the speed of rotation of the rotatable shaft, the signal from a sensor attached to a potentially resonating portion of a machine, such as an accelerometer or strain gauge) to identify one or more oscillations (e.g. by frequency analysis) and the resonant frequency of the one or more oscillations, and then determining one or more of the ranges of undesirable frequencies including the determined one or more frequencies.

The method may comprise executing a displacement determination algorithm at each of a plurality of time steps to process the displacement demand and the net displacement of working fluid during previous cycles of cylinder working volume and to cause at least one said cylinder to undergo an active cycle in which it makes a net displacement of working fluid when the difference between the total amount of working fluid which has been displaced and the total amount of working fluid which has been demanded, exceeds a threshold.

The method may reduce the intensity of one or more components of the frequency spectrum while meeting the displacement demand by advancing and/or retarding the selection of cylinders to undergo an active or inactive cycle in comparison to the selection of cylinders to undergo an active cycle or inactive cycle respectively when the frequency of the one or more intensity peaks of the frequency spectrum is not within the one or more ranges of undesirable frequencies.

It may therefore be that the pattern of cylinders carrying out active or inactive cycles at the same displacement, as a proportion of maximum displacement per revolution of the rotatable shaft, varies, depending on the speed of rotation of the rotatable shaft, thereby reducing the generation of vibrations at one or more undesirable frequencies.

The threshold may be varied to thereby reduce the intensity of one or more undesirable frequency components of the pattern of active cycles of the one or more said cylinders. Further optional features of the variation of the threshold are described above.

Typically, the threshold is varied only when it is determined that at least one said intensity peak of the frequency spectrum would otherwise fall within one or more said ranges of undesirable frequencies. The ranges of undesirable frequencies are each typically a range of frequencies extending above and below the frequency of a resonance maxima.

The method may comprise storing an accumulated displacement error value and at each time step updating the stored accumulated displacement error value by adding the displacement demand represented by the displacement demand signal and subtracting a value representative of the amount of working fluid which has been displaced under the active control of the valve control module on the same or the previous time step. The method may therefore comprise storing and updating an accumulated displacement error value representing the difference between the total amount of working fluid which has been displaced and the total amount of working fluid which has been demanded. Alternatively, the method may comprise integrating the values of the demanded displacement and the determined displacement and considering whether the difference between the two exceeds the threshold.

The method may comprise determining the frequency of one or more intensity peaks of the frequency spectrum of the pattern of active and inactive cycles of cylinder working volume carried out by the cylinders which would be generated if the valve control module selected the pattern of active and inactive cycles of cylinder working volume using a first procedure, taking into account the displacement demand and the speed of rotation of the rotatable shaft, and comparing the determined one or more frequencies with one or more ranges of undesirable frequencies, and if at least one determined frequency falls within at least one range of undesirable frequencies, normally causing the pattern of active and inactive cycles of cylinder working volume to be selected using a second procedure instead of the first procedure, thereby reducing the intensity of the said frequency spectrum in at least one said range of frequencies. The frequency of one or more intensity peaks of the frequency spectrum of the pattern of active and inactive cycles of cylinder working volume carried out by the cylinders may be calculated by a method comprising the step of calculating the frequency of active cycles, or the frequency of inactive cycles, or harmonics thereof. Further optional features of the first and second procedure are described above.

The valve control module may determine the frequency of one or more intensity peaks of the patterns of active and inactive cycles of cylinder working volume carried out by the cylinders, taking into account the displacement demand and the speed of rotation of the rotatable shaft. It may be that the displacement demand and the speed of rotation of the rotatable shaft are the only two continuously varying variables taken into account in determining the frequency of one or more intensity peaks. The valve control module may determine the frequency of one or more intensity peaks of the patterns of active and inactive cycles of cylinder working volume carried out by the cylinders by calculating the fundamental frequency of cylinders carrying out active cycles and/or one or more harmonic thereof, and/or the fundamental frequency of cylinders carrying out inactive cycles, or harmonics thereof and/or one or more harmonics thereof.

The method may comprise receiving a rotatable shaft speed signal and taking into account the rotatable shaft speed signal when determining whether the threshold should be varied. It may be that the method comprises receiving a rotatable shaft speed signal and take into account the rotatable shaft speed signal to determine the current frequency of decisions as to whether a cylinder should undergo an active or an inactive cycle of cylinder working volume and thereby determining whether the threshold should be varied.

Further optional features of the third aspect of the invention are described above in relation to the first and second aspects of the invention and optional features discussed in relation to any one aspect of the invention above are optional features of each aspect of the invention.

DESCRIPTION OF THE DRAWINGS

An example embodiment of the present invention will now be illustrated with reference to the following Figures in which:

FIG. 6 is a table illustrating repetitive execution of a displacement determination algorithm according to a first procedure;

FIG. 14 is a table of the selection of active cycles by the method of the invention;

DETAILED DESCRIPTION OF AN EXAMPLE EMBODIMENT

Figure 1:
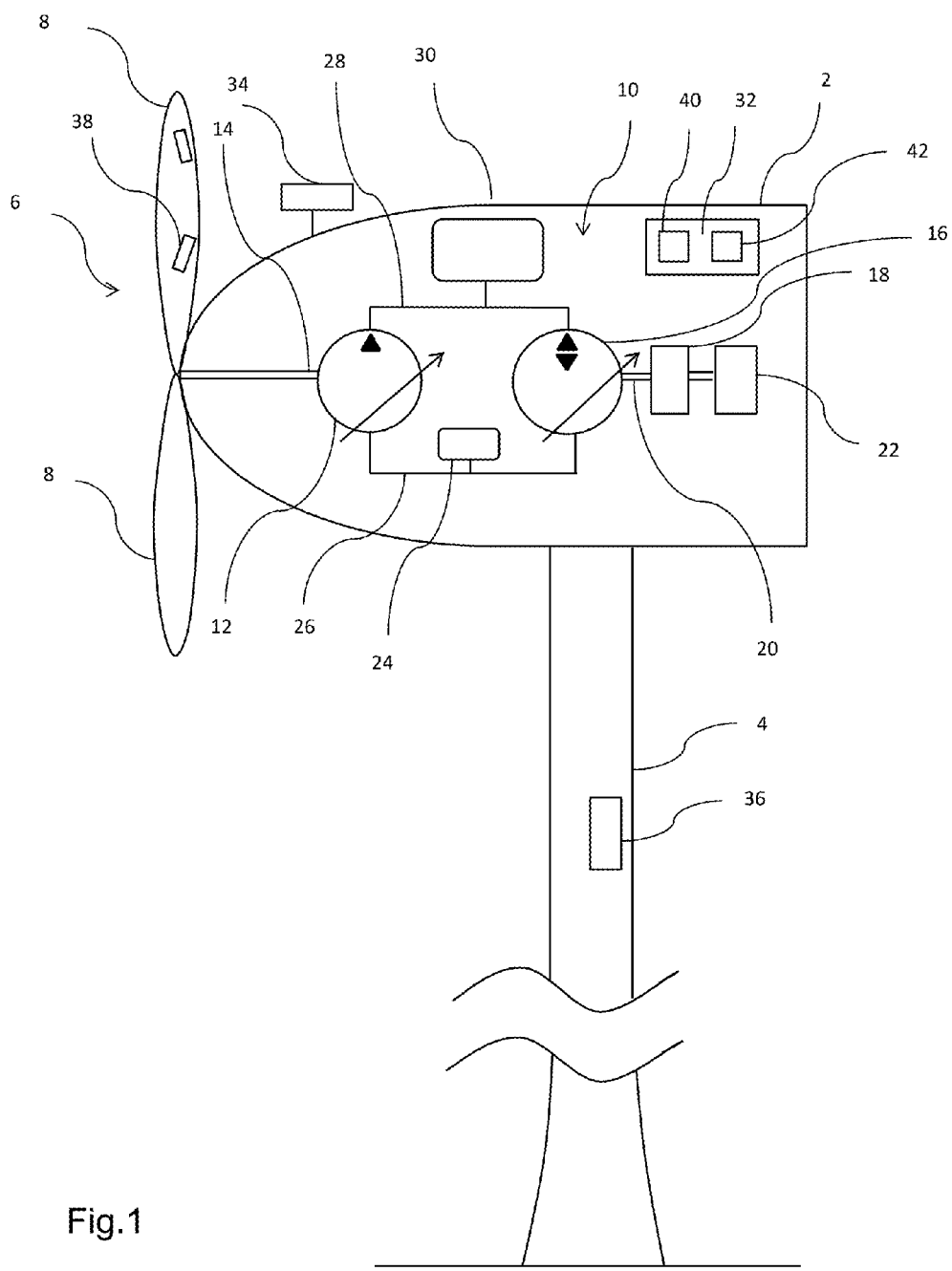
FIG. 1 is a schematic diagram of a wind turbine generator according to the invention.

With reference to FIG. 1, a wind turbine generator 1 comprises a tower nacelle 2, supported by a tower 4 and having a turbine 6, with a plurality of blades 8 mounted thereon.

The nacelle houses a hydraulic transmission, shown generally as 10, which comprises a hydraulic pump 12, which has the rotatable shaft that is coupled to the turbine through a drive shaft 14. The transmission also includes a hydraulic motor 16 which has the rotatable shaft that is coupled to an electricity generator 18 through a generator drive shaft 20. The electricity generator is in turn coupled to an electric grid through a contactor 22.

Within the hydraulic transmission, oil, functioning as working fluid, is supplied from a tank 24 to the input side of the hydraulic pump through low pressure working fluid line 26. Pressurised oil is delivered from an output side of the hydraulic pump to the input side of the hydraulic motor through high pressure working fluid line 28 which is in communication with an oleo pneumatic accumulator 30.

The nacelle also houses a transmission controller 32, which controls the hydraulic transmission by sending control signals to the hydraulic pump and motor, to regulate the displacement of the hydraulic pump and the hydraulic motor. The control signals (the displacement demand signals) demand displacement by the pump and motor, expressed as a fraction of maximum displacement (the displacement demand). The absolute volume of the displacement (volume of working fluid per second) will be the product of the fraction of maximum displacement, the maximum volume which can be displaced per revolution of the rotatable shaft of the pump or motor and the rate of revolution of the rotatable shaft or motor (revolution per second). This way, the transmission controller can regulate the torque applied through the drive shaft 14, which is proportional to the displacement (volume per second) of the hydraulic pump, and the pressure in the high pressure working fluid line. The transmission controller can also regulate the rate of electricity generation, which depends on the displacement (volume per second) of the hydraulic motor, and the pressure in the high pressure working fluid line. The pressure in the high pressure working fluid line increases when the hydraulic pump displaces oil at a higher displacement (volume per second) than the hydraulic motor, and decreases when the hydraulic motor displaces oil at a lower displacement (volume per second) than the hydraulic pump. The oleo-pneumatic accumulator allows the total amount of working fluid in the high pressure side to be varied. In alternative embodiments a plurality of hydraulic pumps and/or a plurality of hydraulic motors are in fluid communication with the high pressure fluid line and so the displacement of each must be considered.

The transmission controller receives, as inputs, signals including the speed of rotation of the rotatable shafts of the pump and motor, and a measurement of the pressure in the high pressure working fluid line. It may also receive a wind speed signal from an anemometer 34, information from the electricity grid, control signals (such as commands to start up or stop, or to increase or decrease high pressure working fluid line pressure in advance of a gust of wind), or other data as required.

The transmission controller also takes into account resonances within the wind turbine generator, such as resonances in the tower, which can be measured using an accelerometer 36, located in the tower, and vibrations in the turbine blades, which can be measured using an accelerometer, or strain gauge 38 mounted on one of the blades.

The transmission controller 32 comprises a single processor 40, in electronic communication with data storage 42, comprising a tangible computer readable medium, such as solid state memory, which stores the programme, and data required during operation. Machine controllers (not shown in FIG. 1) in the pump and motor, at least part of which functions as valve control modules, generate valve control signals responsive to requested displacement from the transmission controller. Nevertheless, one skilled in the art will appreciate that the control of the transmission can be implemented as a plurality of distributed computing devices, each of which may implement parts of the overall control functionality, or as a single device.

Figure 2:
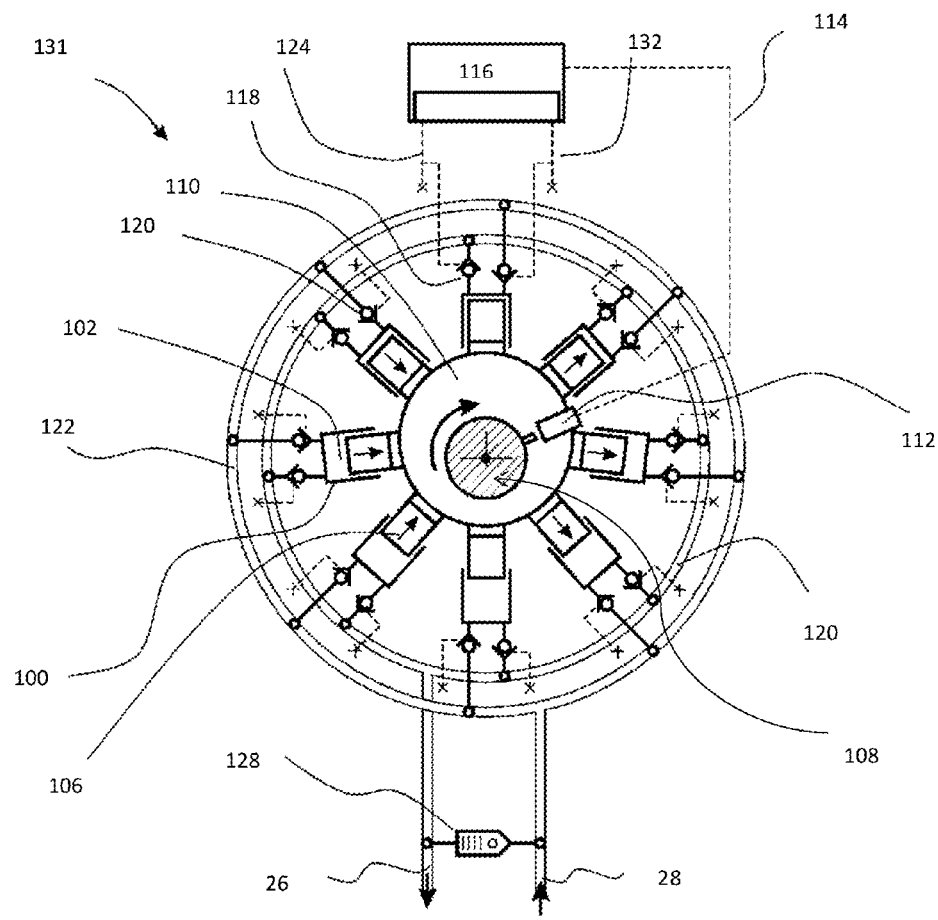
FIG. 2 is a schematic diagram of a hydraulic motor according to the invention.

FIG. 2 illustrates the hydraulic motor 16 in the form of an electronically commutated hydraulic pump/motor comprising a plurality of cylinders 100 which have working volumes 102 defined by the interior surfaces of the cylinders and pistons 106 which are driven from a rotatable shaft 108 by an eccentric cam 110 and which reciprocate within the cylinders to cyclically vary the working volume of the cylinders. The rotatable shaft is firmly connected to and rotates with the generator drive shaft 20. A shaft position and speed sensor 112 determines the instantaneous angular position and speed of rotation of the shaft, and through signal line 114 informs the machine controller 116 of the motor, which enables the machine controller to determine the instantaneous phase of the cycles of each cylinder.

The cylinders are each associated with Low Pressure Valves (LPVs) in the form of electronically actuated face-sealing poppet valves 118, which face inwards toward their associated cylinder and are operable to selectively seal off a channel extending from the cylinder to a low pressure working fluid line 120, which may connect one or several cylinders, or indeed all as is shown here, to the low pressure working fluid line 26 of the WTG. The LPVs are normally open solenoid closed valves which open passively when the pressure within the cylinder is less than or equal to the pressure within the low pressure working fluid line, i.e. during an intake stroke, to bring the cylinder into fluid communication with the low pressure working fluid line, but are selectively closable under the active control of the controller via LPV control lines 124 to bring the cylinder out of fluid communication with the low pressure working fluid line. Alternative electronically controllable valves may be employed, such as normally closed solenoid opened valves.

The cylinders are each further associated with High Pressure Valves (HPVs) 126 in the form of pressure actuated delivery valves. The HPVs open outwards from the cylinders and are operable to seal off a channel extending from the cylinder to a high pressure working fluid line 122, which may connect one or several cylinders, or indeed all as is shown here, to the transmission high pressure working fluid line 28. The HPVs function as normally-closed pressure-opening check valves which open passively when the pressure within the cylinder exceeds the pressure within the high pressure working fluid line. The HPVs also function as normally-closed solenoid opened check valves which the controller may selectively hold open via HPV control lines 132 once that HPV is opened by pressure within the associated cylinder. Typically the HPV is not openable by the controller against pressure in the high pressure working fluid line. The HPV may additionally be openable under the control of the controller when there is pressure in the high pressure working fluid line but not in the cylinder, or may be partially openable, for example if the valve is of the type and is operated according to the method disclosed in WO 2008/029073 or WO 2010/029358.

In a normal mode of operation described in, for example, EP 0 361 927, EP 0 494 236, and EP 1 537 333, the contents of which are hereby incorporated herein by way of this reference, the motor controller selects the net rate of displacement of fluid from the high pressure working fluid line by the hydraulic motor by actively closing one or more of the LPVs shortly before the point of minimum volume in the associated cylinder's cycle, closing the path to the low pressure working fluid line which causes the fluid in the cylinder to be compressed by the remainder of the contraction stroke. The associated HPV opens when the pressure across it equalises and a small amount of fluid is directed out through the associated HPV. The motor controller then actively holds open the associated HPV, typically until near the maximum volume in the associated cylinder's cycle, admitting fluid from the high pressure working fluid line and applying a torque to the rotatable shaft. In an optional pumping mode the controller selects the net rate of displacement of fluid to the high pressure working fluid line by the hydraulic motor by actively closing one or more of the LPVs typically near the point of maximum volume in the associated cylinder's cycle, closing the path to the low pressure working fluid line and thereby directing fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement. As well as determining whether or not to close or hold open the LPVs on a cycle by cycle basis, the controller is operable to vary the precise phasing of the closure of the HPVs with respect to the varying cylinder volume and thereby to select the net rate of displacement of fluid from the high pressure to the low pressure working fluid line or vice versa.

Arrows on the ports 122, 28 indicate fluid flow in the motoring mode; in the pumping mode the flow is reversed. A pressure relief valve 128 may protect the hydraulic motor from damage.

Figure 3:
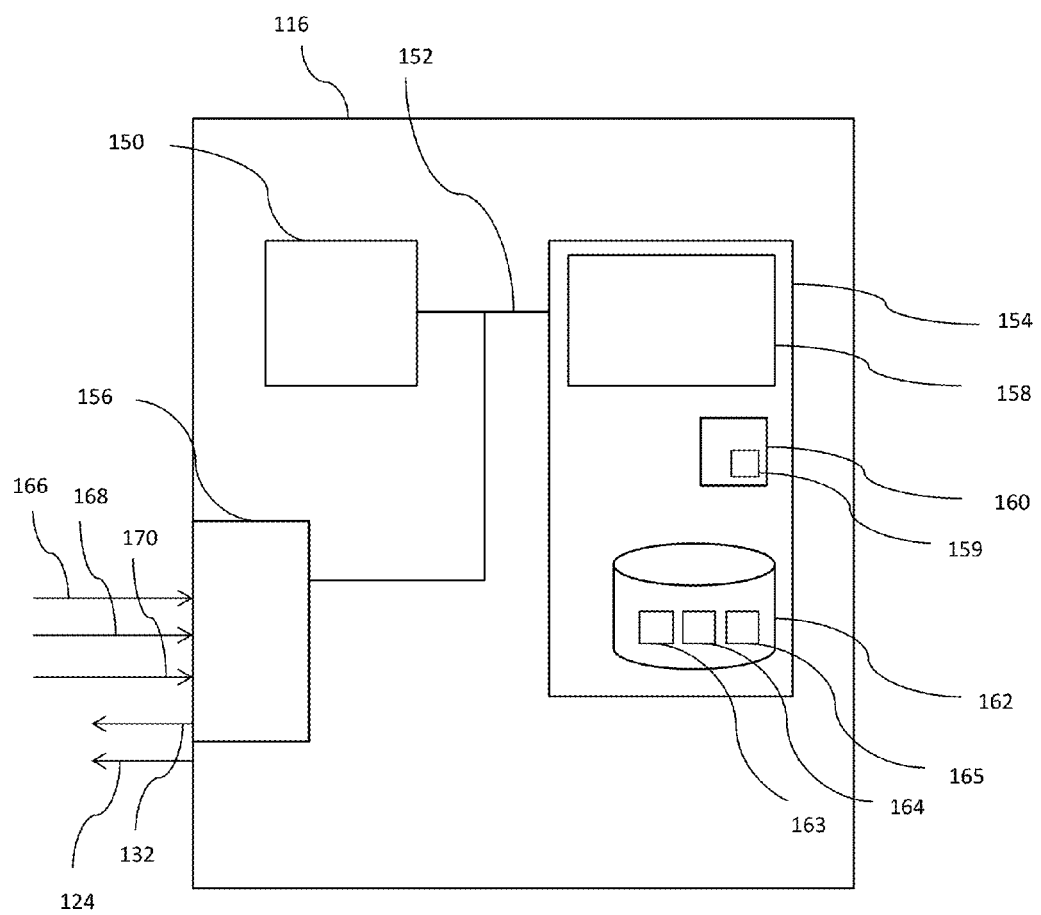
FIG. 3 is a schematic diagram of the valve control module of the hydraulic motor.

FIG. 3 is a schematic diagram of the machine controller 116 of the motor. The structure of the pump controller corresponds. A processor 150, such as a microprocessor or microcontroller, is in electronic communication through a bus 152 with memory 154 and an input-output port 156. The memory stores a program 158 which implements execution of a displacement determination algorithm to determine the net volume of working fluid to be displaced by each cylinder on each cycle of cylinder working volume, as well as one or more variables 160 which store an accumulated displacement error value and the memory also stores a database 162 which stores data concerning each cylinder, such as the angular position of each cylinder 163 and whether or not it is deactivated 164 (for example, because it is broken). In some embodiments, the database stores the number of times 165 each cylinder has undergone an active cycle. In some embodiments, the program comprises program code 159, functioning as the resonance determining module, which calculates one or more ranges of undesirable frequencies.

The controller receives a displacement demand signal 34, a shaft position (i.e. orientation) signal 166 and typically a measurement of the pressure 168 in the high pressure line. The speed of rotation of the rotatable shaft is determined from the rate of change of shaft position and function as the speed of rotation of the rotatable shaft The outputs from the controller include high pressure valve control signals through high pressure valve control lines 126 and low pressure valve control signals through low pressure valve control lines 118. The controller aims to match the total displacement from the cylinders to the displacement demand, over time. The shaft position is required to enable valve control signals to be generated in phased relationship with cycles of cylinder working volume. The measurement of pressure can be used to determine the exact amount of working fluid displaced or in other calculations. The controller might also receive signals indicating whether cylinders are broken, and should therefore be disabled, and to enable the database 162 to be updated accordingly.

The hydraulic pump generally corresponds to the hydraulic motor except that it operates in the pumping mode described above and is typically on a larger scale. Instead of a single lobed eccentric there may be more, in the case of a multi-lobe ring cam. The high pressure valves need not be actively controlled by the controller and may comprise check valves.

Figure 4:
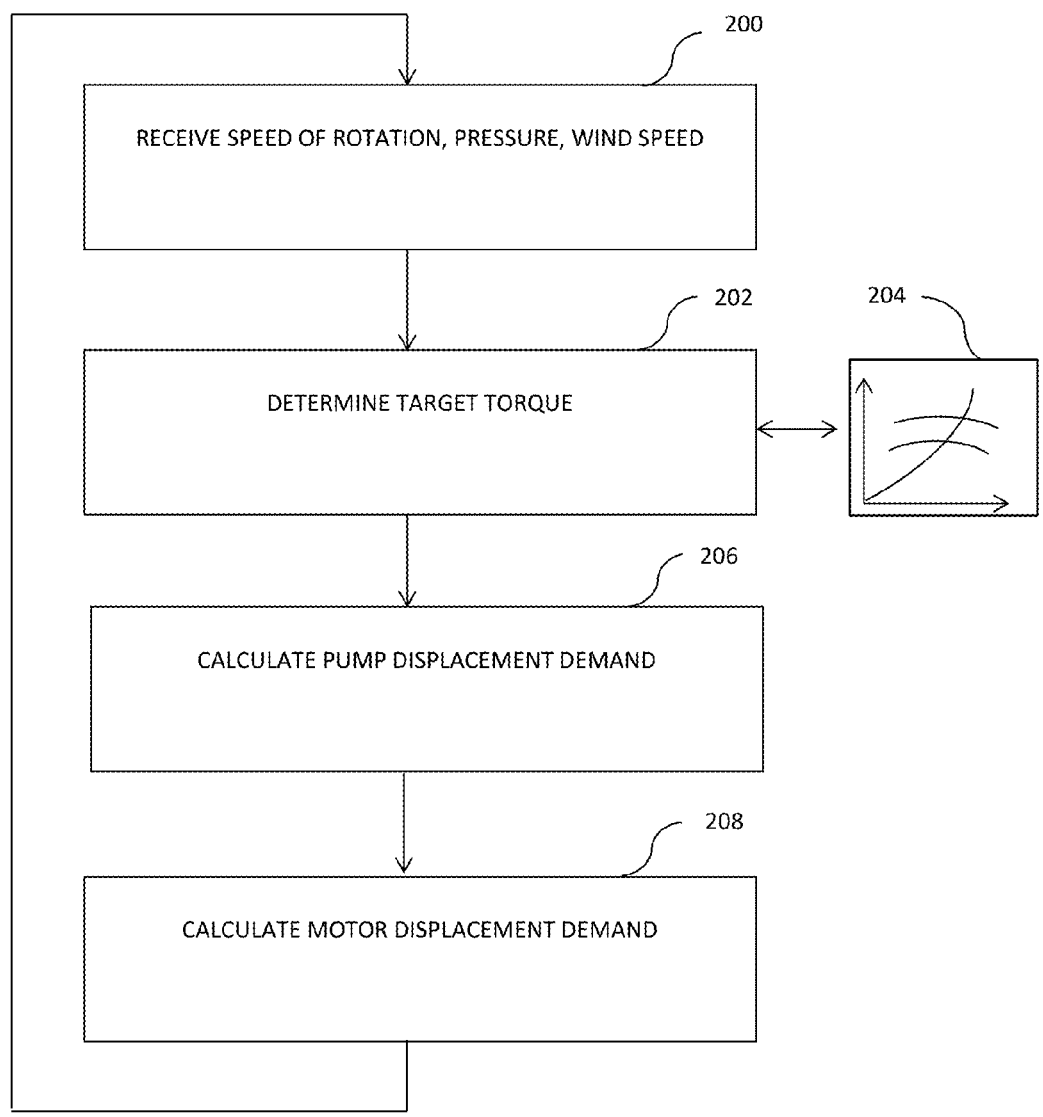
FIG. 4 is a flow diagram of the operation of the transmission valve control module.

During operation of the hydraulic transmission by the process of FIG. 4, the hydraulic transmission controller 30 receives 200 input signals including the speed of rotation of the turbine 2 (which is the same as, or a geared ratio of the speed of rotation of the rotatable shaft of the hydraulic pump, as the two are coupled), and the pressure in the pressurised fluid working fluid line 18, as well as the wind speed. The transmission controller next determines 202 a target torque to be applied to the turbine by the hydraulic pump, with reference to a look up table 204 which summarises ideal target torque and shaft rotation speed at a plurality of different wind speeds. Once a target torque has been determined the transmission controller then calculates 206 the displacement of the hydraulic pump required to obtain the target torque. This is then transmitted to the hydraulic pump as the displacement demand signal received by the pump. Volumes of working fluid and rates of displacement may be calculated in any suitable units. This displacement demand can for example be expressed as a fraction of the maximum displacement of which the hydraulic pump is capable per revolution of the rotatable shaft. In this example, the displacement is expressed as an average percentage of the maximum output per revolution of the rotatable shaft. The actual rate of displacement which this represents, expressed as volume of fluid per second, will be the product of both the displacement demand, the maximum volume which can be displaced by a cylinder, the number of cylinders and the speed of rotation of the pump rotatable shaft. The resulting torque will be proportional to this displacement and to the pressure in high pressure working fluid line.

Once the pump displacement has been calculated, the motor displacement can also be calculated. Typically, the motor displacement is calculated to maintain a desired pressure in the pressurised fluid line. The calculated displacement is transmitted to the motor and received as the demand displacement signal of the motor. However, a number of other factors may be taken into account. For example, the motor displacement demand can be varied in order to vary the pressure in the high pressure working fluid line, which increases when motor displacement is less than the displacement by the hydraulic pump (in volume per second), and decreases when the displacement of the hydraulic motor is greater than the displacement of the hydraulic pump (in volume per second). There may be other factors. For example, it may be desirable for one or both of the electricity generators to be switched between being driven at a substantially constant torque, and being switched off, to minimise windage losses and maximise the efficiency of electricity generation.

In this example embodiment, the hydraulic motor has the configuration of FIG. 2, in which the cam which drives the pistons has a single lobe, and so there is a single cycle of cylinder working volume per rotation of the rotatable shaft of the hydraulic motor.

Figure 5:
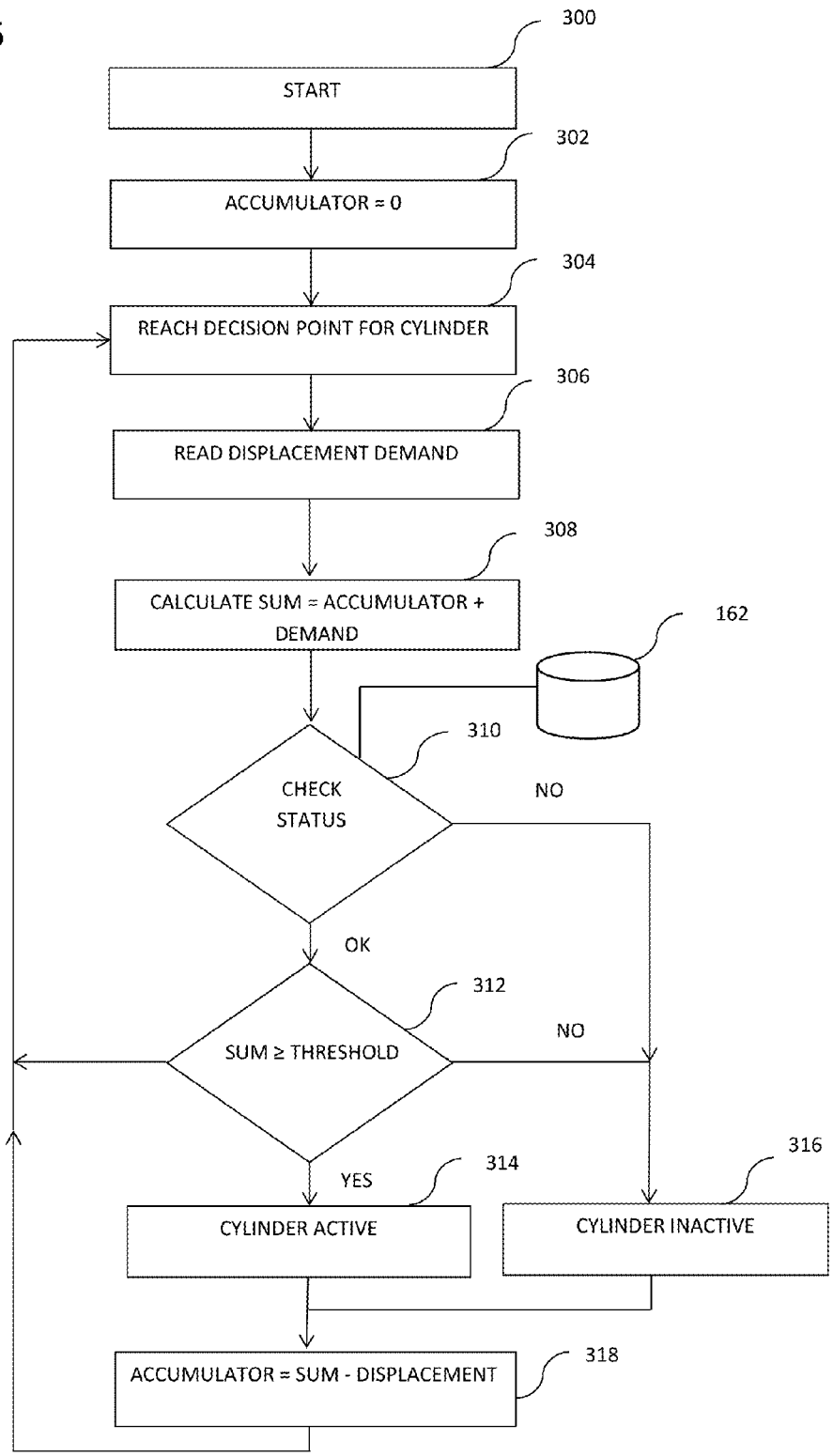
FIG. 5 is a flow diagram of a displacement determination algorithm for determining the displacement by individual cylinders in a normal operating mode, (the first procedure)

FIG. 5 illustrates the procedure carried out by the hydraulic motor to determine the net displacement by each cylinder sequentially, in a default operating procedure (the first procedure), when it is not determined that unwanted frequencies will be generated. The procedure begins 300, whereupon a stored variable ACCUMULATOR 160 is set 302 to zero. The variable ACCUMULATOR stores the difference between the amount of working fluid displacement represented by the displacement demand and the amount which is actually displaced.

The rotatable shaft of the hydraulic motor then rotates until it reaches 304 a decision point for an individual cylinder. For the example shown in FIG. 2, there are eight cylinders, and so each decision point will be separated by 45 degrees of rotation of the rotatable shaft. The actual period of time which arises between the decision points will therefore be the period of time required for the rotatable shaft to rotate by 45 degrees, which is inversely proportional to the speed of rotation of the rotatable shaft.

At each decision point, the motor controller reads 306 the motor displacement demand received from the transmission controller. The controller then calculates 308 a variable SUM which equals ACCUMULATOR plus the demanded displacement. Next, the status of the cylinder which is being considered is checked 310. This is carried out with reference to the database 162, 164 of cylinder data. If it is found that the cylinder is deactivated (for example because it is broken), no further action is taken for that cylinder. The method then repeats from step 304 once the decision point is reached for the next cylinder.

Alternatively, if it is found that the cylinder has not been disabled, then SUM is compared 312 with a threshold. This value may simply be the maximum volume of working fluid displaceable by the cylinder, when the only options being considered are an inactive cycle with no net displacement or a full displacement active cycle in which the maximum displacement of working fluid by the cylinder is selected. However, the threshold may be higher or lower. For example, it may be less than the maximum displacement by an individual cylinder, for example, where it is desired to carry out a partial cycle, in which only part of the maximum displacement of the cylinder is displaced.

If SUM is greater than or equal to the threshold then it is determined that the cylinder will undergo an active cycle. Alternatively, if SUM is not greater than or equal to the threshold then it is determined that cylinder will be inactive on its next cycle of cylinder working volume, and will have a net displacement of zero.

Control signals are then sent to the low and high pressure valves for the cylinder under consideration to cause the cylinder to undergo an active or inactive cycle, as determined. (In the case of pumping, it may be that the high pressure valves are not electronically controlled and the control signals only concern the low pressure valves).

This step effectively takes into account the displacement demand represented by the displacement demand signal, and the difference between previous displacements represented by the displacement demand signal previous net displacements determined by the controller (in this case, in the form of the stored error), and then matches the time averaged net displacement of working fluid by the cylinders to the time averaged displacement represented by the displacement demand signal by causing a cylinder to undergo an active cycle in which it makes a net displacement of working fluid, if SUM equals or exceeds a threshold. In that case, the value of the error is set to SUM minus the displacement by the active cylinder. Alternatively, if SUM does not equal or exceed the threshold, then the cylinder is inactive and SUM is not modified.

The procedure restarts from step 304 when the decision point is reached for the next cylinder.

It can therefore be seen that ACCUMULATOR 160 maintains a record of the difference between the displacement which has been demanded, and the displacement which has actually occurred. On each cycle, the demanded displacement is added to the displacement error value, and the actual selected displacement is subtracted. ACCUMULATOR effectively records the difference between demanded and provided displacement and an active cycle takes place whenever this accumulated difference exceeds a threshold.

One skilled in the art will appreciate that the effects of this displacement determination algorithm can be obtained in several ways. For example, rather than subtracting the selected displacement from the ACCUMULATOR variable, it would be possible to sum the displacement which has been demanded, and the displacement which has been delivered, over a period of time, and to select the displacement of individual cylinders to keep the two evenly matched.

In alternative embodiments, there may be sets of cylinders which are operated in phase throughout each cycle of cylinder working volume. For example, this may arise if the cam has multiple lobes or if there are multiple axially spaced banks of cylinders. In this case, at each decision point the selection of an active cycle or inactive cycle may be made for each cylinder in the set at once.

FIG. 6 is a table showing an example of the operation of the displacement determination algorithm of FIG. 5 at subsequent time steps, when the displacement demand is 25% of the maximum displacement of the machine (the pump or motor, as appropriate). The first column is the time step, expressed in seconds. The second column is the threshold with which SUM is compared. In this example, it is constant. The third column is the value of the variable SUM, expressed as a percentage. The fourth column is the number of cylinders is selected to carry out an active cycle. In this example, it will only ever be zero or one. However, in embodiments where multiple cylinders have coincident decision points, it may be a higher number. The value of ACCUMULATOR is in the fifth column, and the final column shows whether or not a cylinder undergoes an active cycle. In this table, each selection of an active cycle is labelled normal. A constant demanded displacement, equal to one quarter of the maximum displacement demand, has been selected for ease of explanation, however, in practice, the displacement demand will of course vary. It can be seen that in the example of FIG. 6 a cylinder selected to undergo an active cycle on each fourth cycle, every 0.4 seconds. Accordingly, the fundamental frequency of selection of a cylinder to carry out an active cycle is 2.5 Hz and the fundamental frequency of selection of a cylinder to carry out an inactive cycle is 7.5 Hz. It will be appreciated that if the speed of rotation of the rotatable shaft increased by a factor of n, then both of the fundamental frequencies will also increase by a factor of n.

In general, the pattern of active and inactive cycles of cylinder working volume has a frequency spectrum with one or more intensity peaks. The frequency of these peaks will vary depending on the sequence of active and inactive cycles and the speed of rotation of the rotatable shaft. For example, in the case of the pattern of FIG. 6, the frequency spectrum will have intensity peaks at 2.5 and 7.5 Hz.

Figure 7:
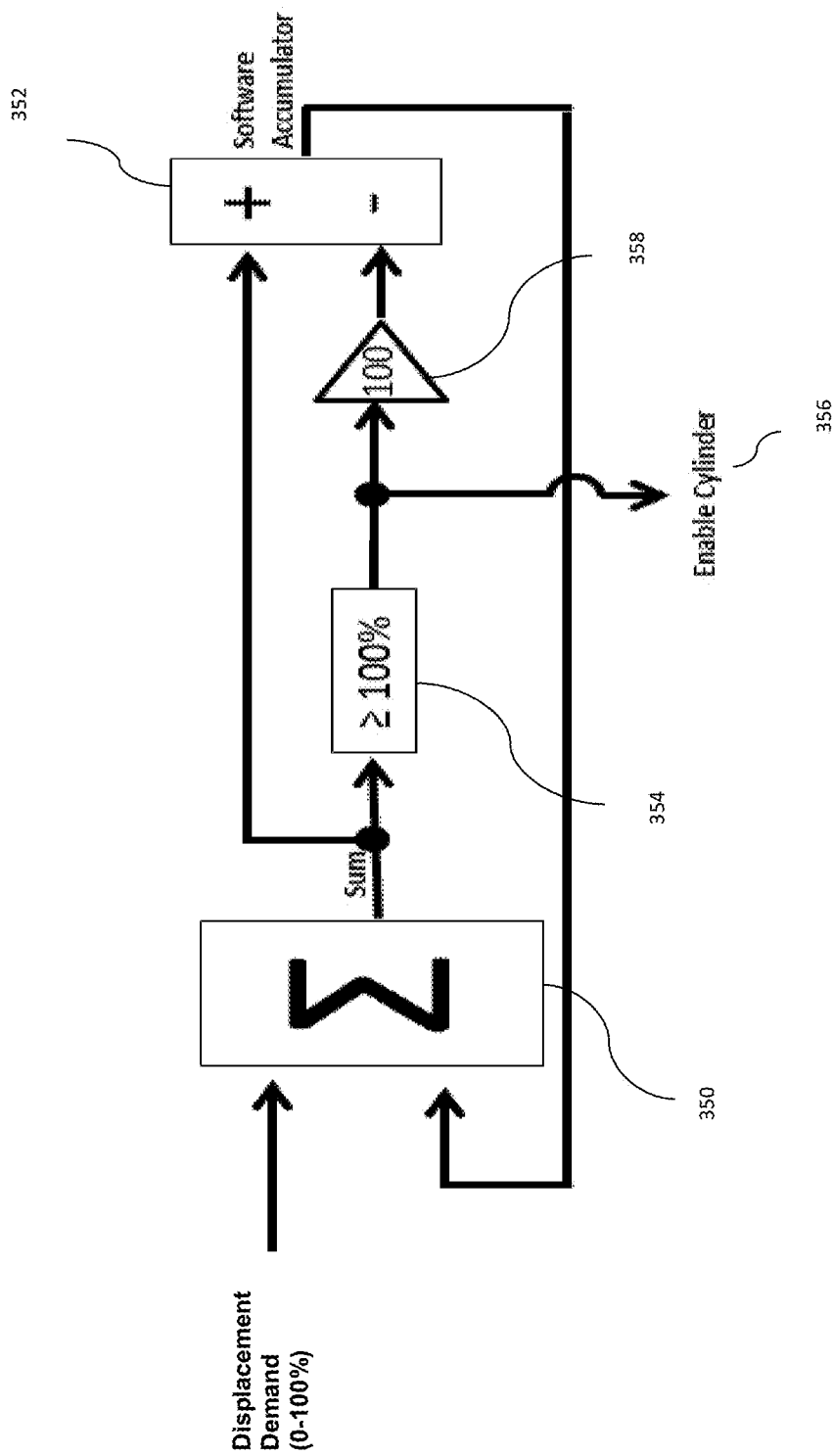
FIG. 7 is a schematic diagram of the control logic for the displacement determination algorithm of FIGS. 5 and 6.

FIG. 7 is a schematic diagram of the displacement determination algorithm of FIGS. 5 and 6. The requested displacement is received by a sigma block 350, which sums the requested displacement with the output from software accumulator 352, which stores the value of ACCUMULATOR. The output from the sigma block is compared with a threshold by a comparator 354 and, whenever this threshold is reached or exceeded, an enable cylinder 356 output is triggered, causing a cylinder to undergo an active cycle. This output is also fed, through an amplifier 358, which applies 'gain' as the output for the sigma block is between 0 and 1, rather than in the same percentage format as the remainder of the displacement determination algorithm, to a subtracting input of the software accumulator.

Figure 8A:
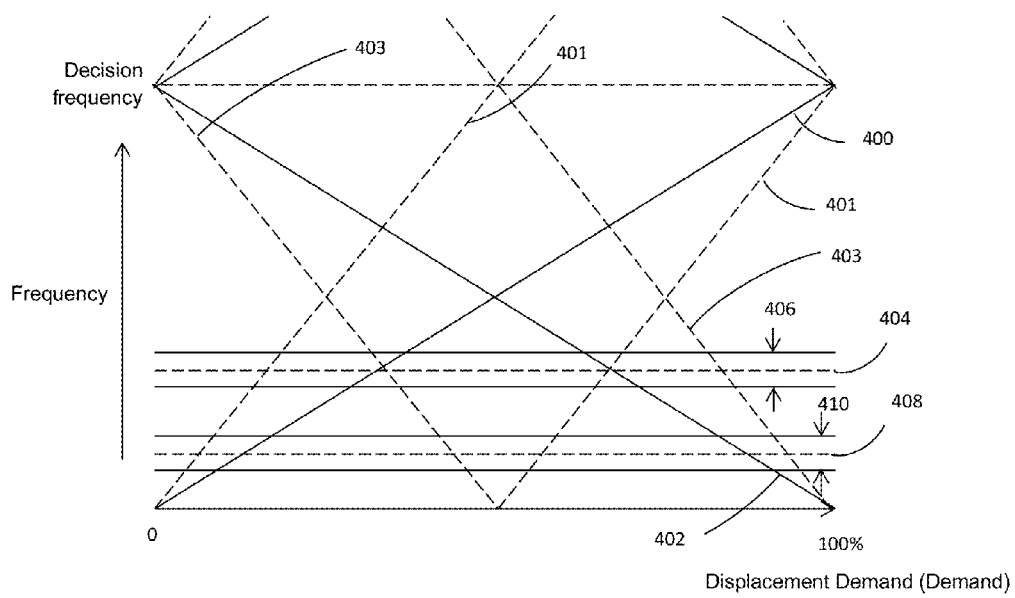
FIGS. 8A and 8B are schematic diagrams of the variation of the frequency of intensity peaks of the frequency spectrum of the pattern of cylinders carrying out active and inactive cycles of cylinder working volume with requested displacement.

FIG. 8A is a schematic diagram showing frequency relationships between selected intensity peaks and the requested displacement demanded of the hydraulic pump, or hydraulic motor, expressed as a proportion of the maximum displacement of the pump or motor (volume per revolution of the rotatable shaft). As displacement demand (x axis) increases, the frequency (y axis) of the selection of cylinders to carry out active cycles (the fundamental frequency of activation) 400, and so the frequency of a corresponding intensity peak in the frequency spectrum, increases linearly, and reaches the frequency of cylinder selection decisions when the requested displacement reaches its maximum. FIG. 8A also illustrates the frequency 402 of the selection of cylinders to carry out inactive cycles, which is the frequency of a corresponding intensity peak in the frequency spectrum. It will be seen that this decreases from the frequency of cylinder selection decisions to zero as the requested displacement increases from zero to 100% of the maximum displacement of the hydraulic pump or motor. The actual relationship between the frequencies of specific intensity peaks and requested displacement may be more complex. For example, FIG. 8 assumes that all cycles are either active cycles in which 100% of the maximum displacement of any individual cylinder is displaced or inactive cycles in which no net displacement of working fluid is made. In practice, the graph would appear different if there was variation in the amount of working fluid displaced between active cycles.

Figure 9A:
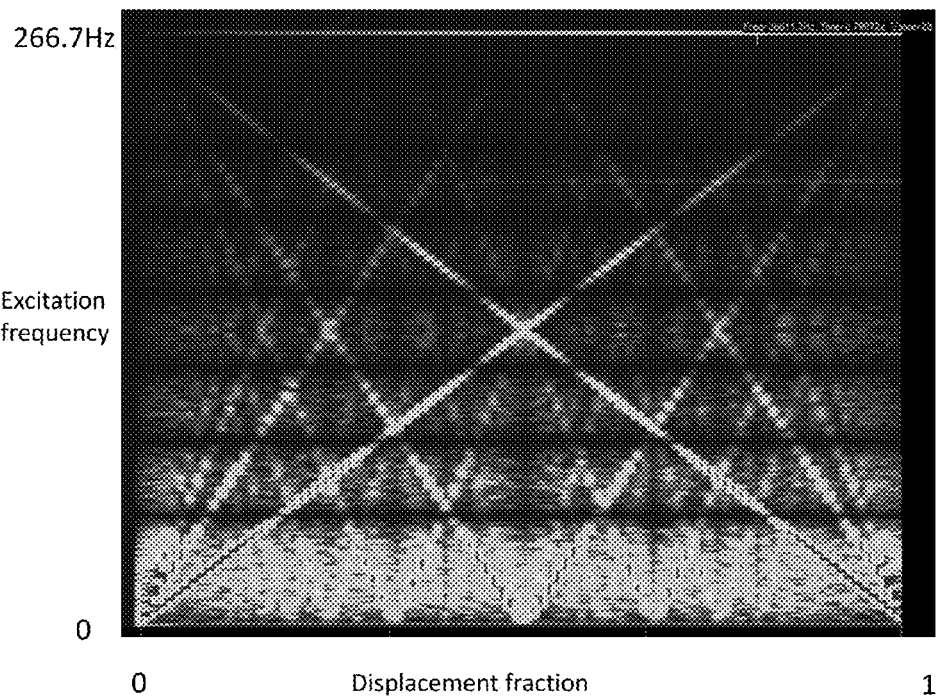
FIGS. 9A and 9B are examples of frequency spectrums (sonograms) showing the variation in the intensity of frequency components of the frequency spectrum of the pattern of cylinders carrying out active and inactive cycles as the rate of displacement of working fluid varies from 0 to 100% of maximum displacement in an example embodiment, at a fixed speed of rotation of the rotatable shaft of 1,000 rpm.

FIG. 9A shows calculated frequency spectrum data for the case of a machine having 16 cylinders in total in the form of two banks of eight cylinders which are equally spaced (by 45°), where the two banks are offset by 22.5° and a speed of rotation of the rotatable shaft of 1000 rpm. There are cylinders at 16 unique phases of cylinder working volume. The intensity of frequency components of the frequency spectrum is shown by varying shading and intensity peaks can be seen. In this example, the fundamental frequency of cylinder selection decisions is therefore 1000×16/60=266.7 Hz and it can be seen that as the displacement fraction (i.e. the proportion of maximum displacement per rotation of the rotatable shaft, typically dictated by the displacement demand signal) (x axis) increases from 0 to 1, the intensity peak indicative of the fundamental frequency (excitation frequency, y axis) of active cycles has increased linearly from 0 to 266.7 Hz, and the fundamental frequency of inactive cycles has decreased linearly from 266.7 Hz to 0.

With reference to FIG. 8A, the pump or motor controller seeks to avoid selecting a pattern of active and inactive cycles of cylinder working volume with a frequency spectrum having an intensity peak at the resonant frequency of the tower 404 or blades 408, and within bands 406, 410 extending either side of these resonant frequencies. Unlike the intensity peaks in the frequency spectrum of the pattern of active and inactive cycles of cylinder working volume, these resonant frequencies do not vary with the speed of rotation of the rotatable shaft. (In some embodiments, one or more of the resonant frequencies may vary with the speed of rotation of the rotatable shaft, but not proportionately to the speed of rotation of the rotatable shaft, for example one or more resonant frequencies of the blades of a wind turbine generator).

Figure 8B:
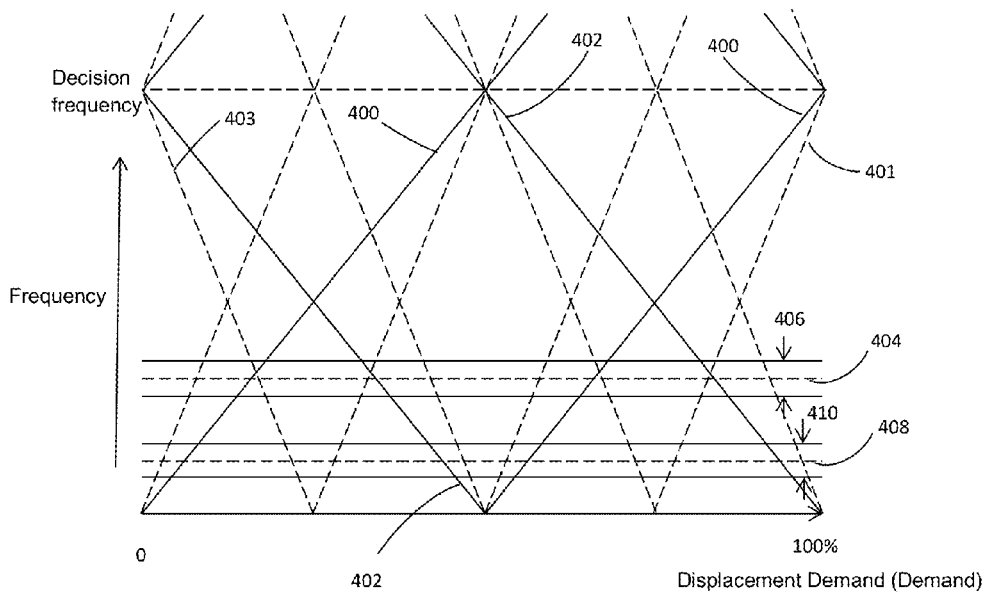

FIG. 8B illustrates the corresponding variation in the frequency of cylinders carrying out active cycles and the frequency of cylinders carrying out inactive cycles (and therefore the frequency of corresponding intensity peaks in the frequency spectrum) if there is some redundancy in cylinders, such that for each cylinder, there is one other cylinder which is operated in substantially the same phase. This might arise if the cam has two lobes (i.e. two maxima and two minima of distance from the axis of rotation), or if there are two banks of cylinders, driven by identical in-phase cams, receiving working fluid from and delivering working fluid to the same source and sink. In this case, it can be seen that the frequency of the cylinder activations (the frequency of the selection of cylinders to carry out active cycles) reaches the decision frequency at a displacement demand of 50% (100% divided by the number of cylinders having the same phase, the redundancy) at which point, one of each pair of cylinders having the same phase is selected at each decision point and the frequency of activations of a second cylinder increases from zero as displacement increases. The frequency of selection of inactive cycles varies correspondingly, and the sum of the frequency of selection of active cycles and the frequency of selection of inactive cycles is always the same, for a given cylinder selection frequency.

Figure 9B:
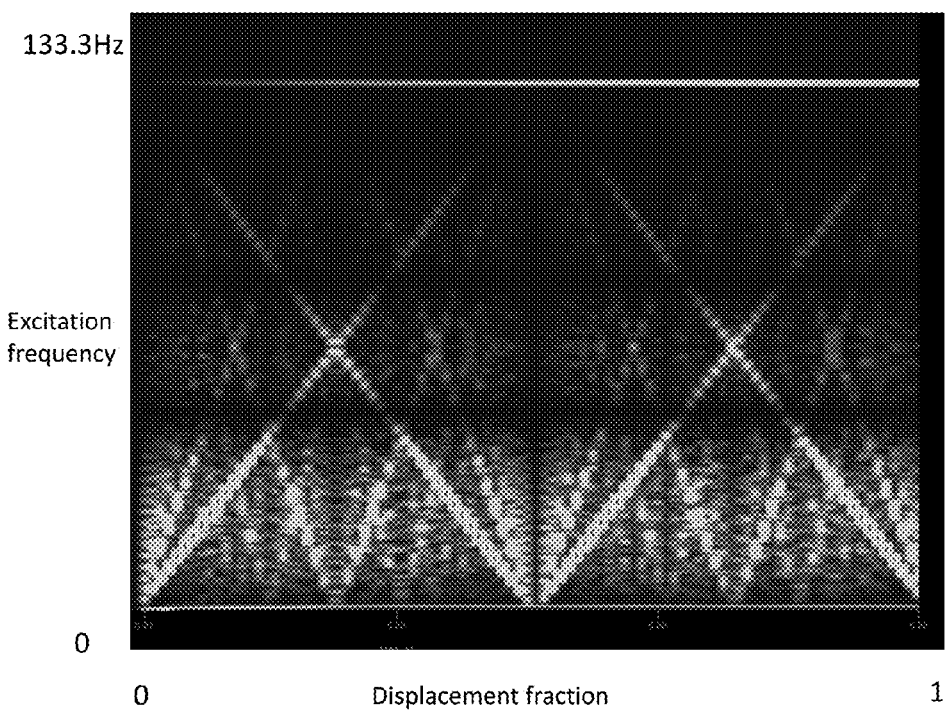

FIG. 9B corresponds to FIG. 9A except that the data relates to a machine with 16 cylinders in two banks of eight equally spaced cylinders (45° apart), where there is no offset between banks and so each cylinder is in phase throughout cycles of cylinder working volume with a corresponding cylinder in the other bank. There is therefore a redundancy of 2 and so there are only cylinders at 8 unique phases. Again the speed of rotation is 1000 rpm. As cylinder selection decisions are made for two cylinders at once, the frequency of decisions is half that of FIG. 9A, i.e. 133.3 Hz. As the displacement fraction increases from 0 to 0.5, the number of cylinders selected to undergo active cycles at each decision is either zero or one, with the proportion of decisions in which one cylinder is selected to undergo an active cycles increasing linearly from 0 to 100%. Accordingly, the fundamental frequency of active cycles increases linearly from 0 to 133.3 Hz. Then, when the displacement fraction is 0.5, the fundamental frequency of active cycles drops to zero. This is because at that displacement fraction, every time a decision is made as to how many of the two cylinders which are being considered should undergo an active cycle, the decision is one cylinder and so there is no variation which might generate resonances. As the displacement fraction increases from 0.5 to 1, the proportion of decisions which result in two cylinders carrying out active cycles increases linearly from 0 to 100% and so the fundamental frequency of active cycles again increases linearly from 0 to 133.3 Hz. The fundamental frequency of inactive cycles equals 133.3 Hz minus the fundamental frequency of active cycles.

As well as the frequency with which the cylinders are selected to carry out active cycles or to carry out inactive cycles, intensity peaks in the frequency spectrum may arise from harmonics of these frequencies, or other frequencies which are linearly related to requested displacement demand (at least within defined ranges) and these harmonics are visible in FIGS. 9A and 9B.

The harmonics can be identified in FIGS. 8 and 9 by lines whose gradient of frequency with respect to displacement is a positive or negative multiple of the gradient of the line of fundamental enabling or disabling frequency. Harmonics above the decision frequency are also typically present and correspond to a reflection of the fundamental and harmonic frequencies across the decision frequency, as illustrated in FIGS. 8A and 8B.

Figure 10:
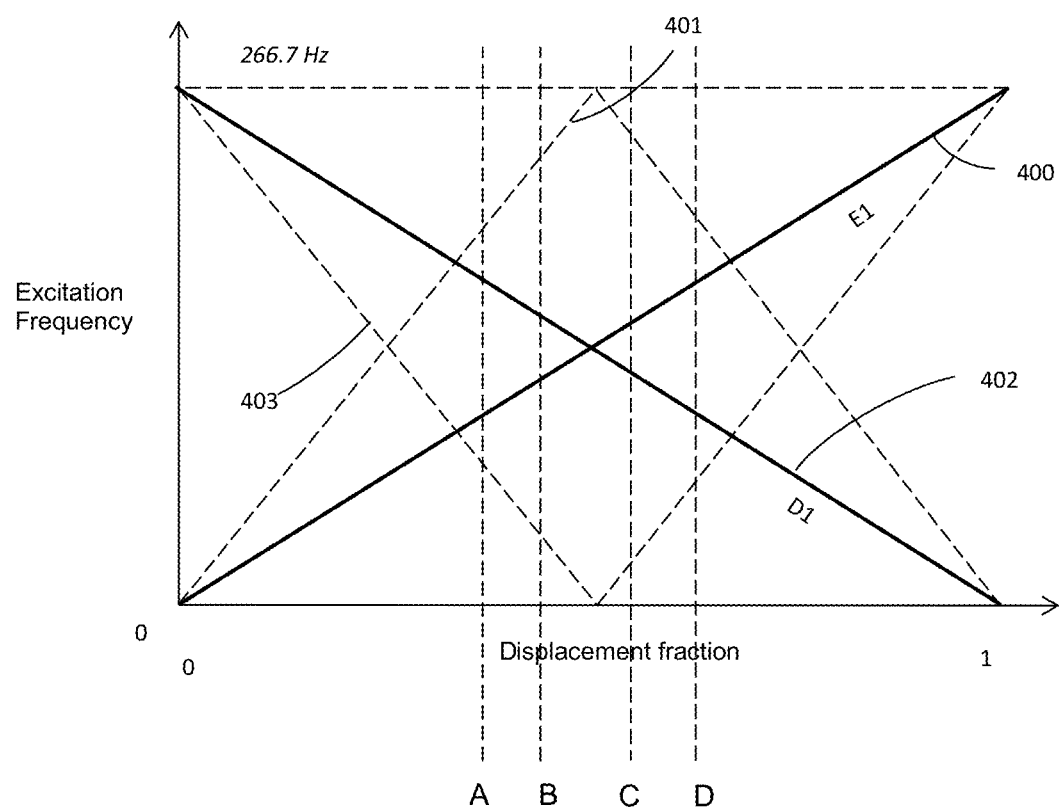
FIG. 10 illustrates the variation in the fundamental frequency of cylinders undergoing active cycles and the fundamental frequency of cylinders undergoing inactive cycles with displacement demand signal.
Figure 11:
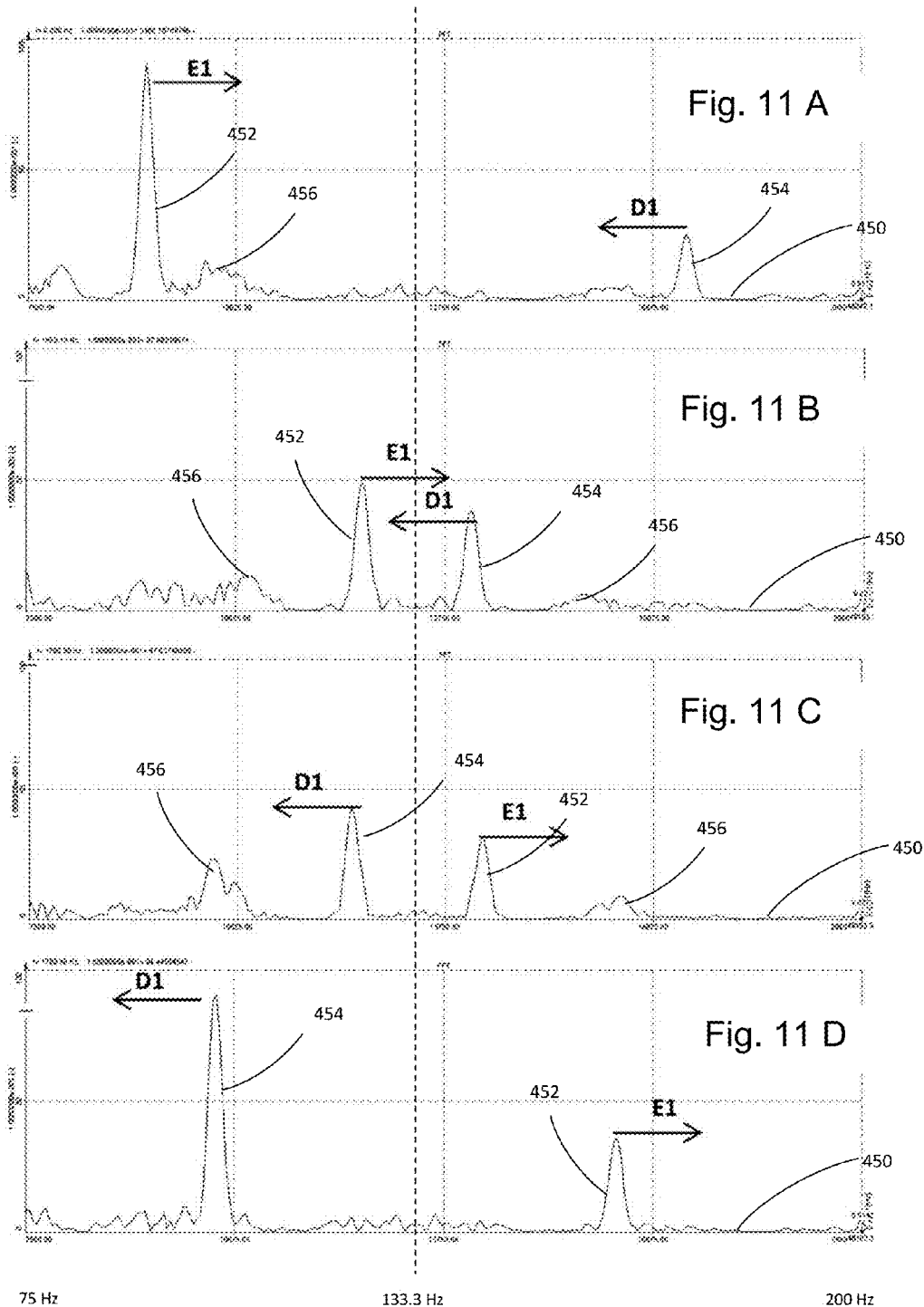
FIGS. 11A through 11D shows frequency spectrums of the pattern of cylinders being selected to undergo active and inactive cycles of cylinder working volume at four different values of the displacement demand signal.

FIGS. 10 and 11 provide a further illustration of the variation in the frequency of intensity peaks 452, 454, 456 of the frequency spectrum 450 of the pattern of active and inactive cycles of cylinder working with displacement fraction. FIGS. 11A through 11D show the frequency spectrum at displacement fractions A, B, C and D of FIG. 10. The fundamental frequency of active cycles shown as E1 and the fundamental frequency of inactive cycles shown as D1 are complementary According to the invention, the hydraulic pump and motor controllers are programmed to generate valve command signals to control the electronically controlled valves associated with each cylinder, in phased relationship to cycles of cylinder working volume, and they determine whether each cylinder carries out an active cycle or an inactive cycle, for each cycle of cylinder volume, in such a way that, averaged over time, the total net displacement of working fluid delivered by the pump or motor is matched to the displacement demand indicated by the displacement demand signal received from the transmission controller. However, when it is determined that the resulting pattern of active and inactive cycles of cylinder working volume would lead to the generation of intensity peaks in the frequency spectrum within one or more bands of undesirable frequency components, then instead of using the procedure of FIGS. 5 and 6, an alternative procedure (the second procedure) is employed. Using the alternative procedure, although the same total net displacement will be obtained, averaged over time, the precise pattern of active and inactive cycles of cylinder working volume is changed to reduce the intensity of components of the frequency spectrum within the range of undesirable frequencies.

In one approach, the threshold used by comparator 354 in step 312 of the procedure of FIG. 5 is varied in such a way as to remove the undesirable intensity peaks of the frequency spectrum.

Figure 12:
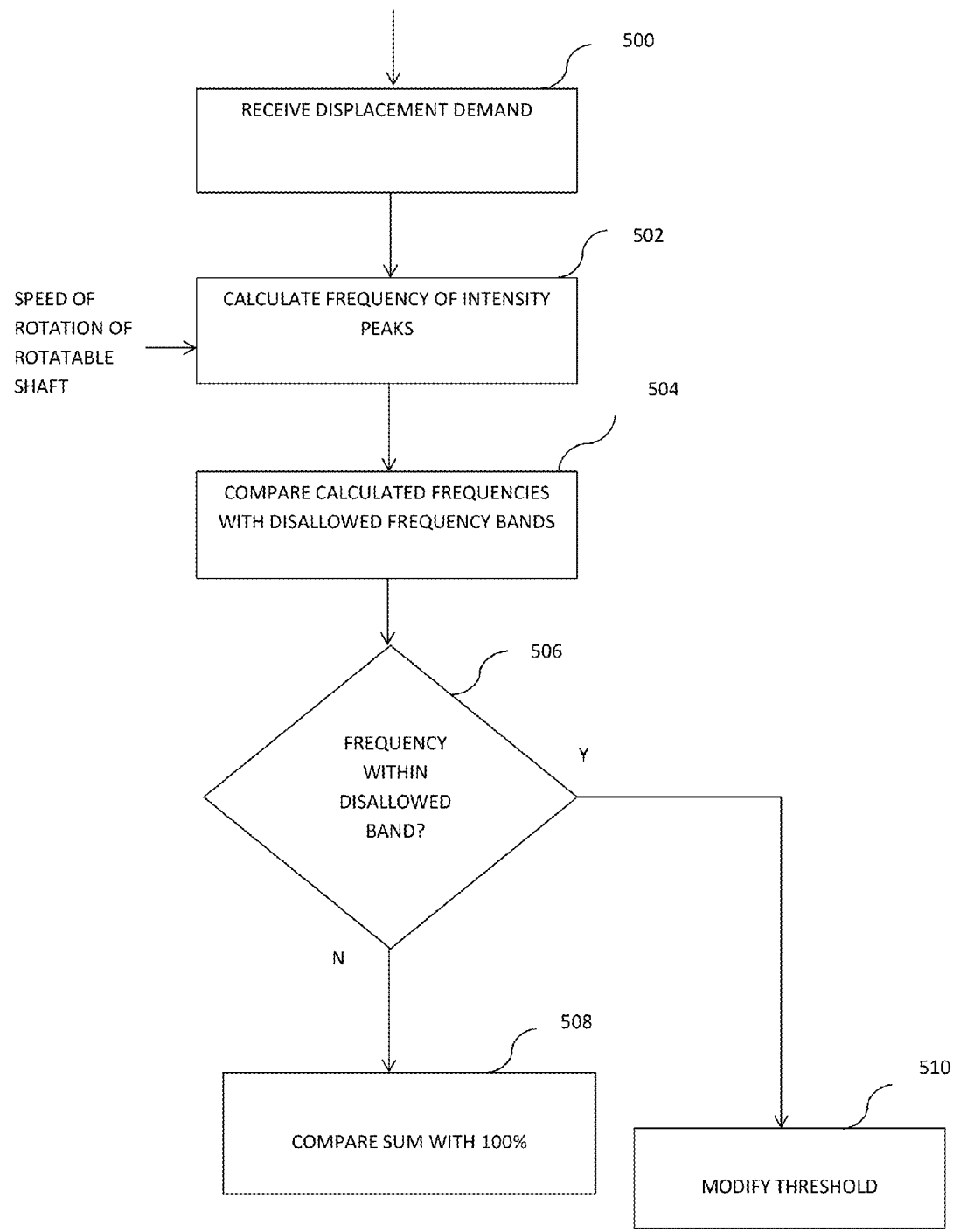
FIG. 12 is a schematic diagram of control logic for modifying the decision threshold according to the invention.

FIG. 12 illustrates the procedure carried out by the pump and/or motor controllers according to the invention. The displacement demand for the pump or motor is received 500 from the transmission controller. The frequency of various intensity peaks in the frequency spectrum which would arise if the pump or motor, as appropriate, implemented the displacement determination algorithm of FIGS. 5 and 6, for that displacement demand, are then calculated 502. This step requires, as an input, the speed of rotation of the rotatable shaft of the pump or motor, as appropriate. The frequencies which are calculated include the fundamental frequency of selection of cylinders to carry out active cycles, and the fundamental frequency of selection of cylinders to carry out inactive cycles. Typically, other frequencies which are calculated are linear functions thereof. Typically harmonics, (integer multiples), are calculated. However, in some cases resonances can be generated by vibrations which are non-integer multiples of the fundamental frequencies, or whether there is also a fixed offset.

The frequency of the calculated intensity peaks is then compared 504, 506 with disallowed frequency bands, such as the band 406 extending either side of the natural resonant frequency of the tower. The disallowed frequency bands may be different for the hydraulic pump and the motor. For example, it is more important for the pump than the motor to avoid the generation of vibrations having a frequency corresponding to the natural resonant frequency of the blades as the pump is directly coupled to the blades but the motor is not. The hydraulic pump might also avoid the generation of intensity peaks at resonant frequencies such as torsional vibration modes of the drive shaft 14.

In some embodiments, rather than explicitly calculating the frequency of one or more intensity peaks, and comparing these with disallowed frequency bands, a look up table of displacement demand and speed of rotation of rotatable shaft may be employed to determine circumstances where the frequency of intensity peaks may correspond with disallowed frequency bands.

If it is determined that the frequency of the one or more calculated intensity peaks does not fall within any disallowed band, then the displacement on each cycle of cylinder working volume is calculated 508 using the displacement determination algorithm of FIGS. 5, 6A and 6B, in which SUM is compared with a default threshold (in this example, 100% of the maximum displacement by an individual cylinder).

Alternatively, if it is determined that the frequency of one or more of the intensity peaks would fall within a disallowed band, then an alternative procedure is followed to reduce the intensity of frequency components within the disallowed frequency band, by modifying 510 the threshold with which SUM is compared at step 312 of the procedure of FIG. 5 and comparator 354 of FIG. 7.

This threshold is modified by the addition of a square wave pulse having a frequency of between 0.1 and 0.5 of the resonant frequency which is to be avoided. Again, this has the effect of advancing some active cycles (or inactive cycles) and retarding others, changing the frequency spectrum of the pattern of active and inactive cycles of cylinder working volume, but not modifying the time averaged total displacement of working fluid. When the pump displacement demand changes so that implementation of the displacement determination algorithm of FIGS. 5 to 7 would no longer generate an intensity peak within any of the disallowed frequency bands, the square wave pulse is no longer added. The frequency of the wave form which modulates the threshold is at most half of the frequency of the unwanted frequency component, and the optimum can be calculated for any system. We have found that the range of 0.2 to 0.3 times the unwanted frequency is particularly suitable.

Figure 13:
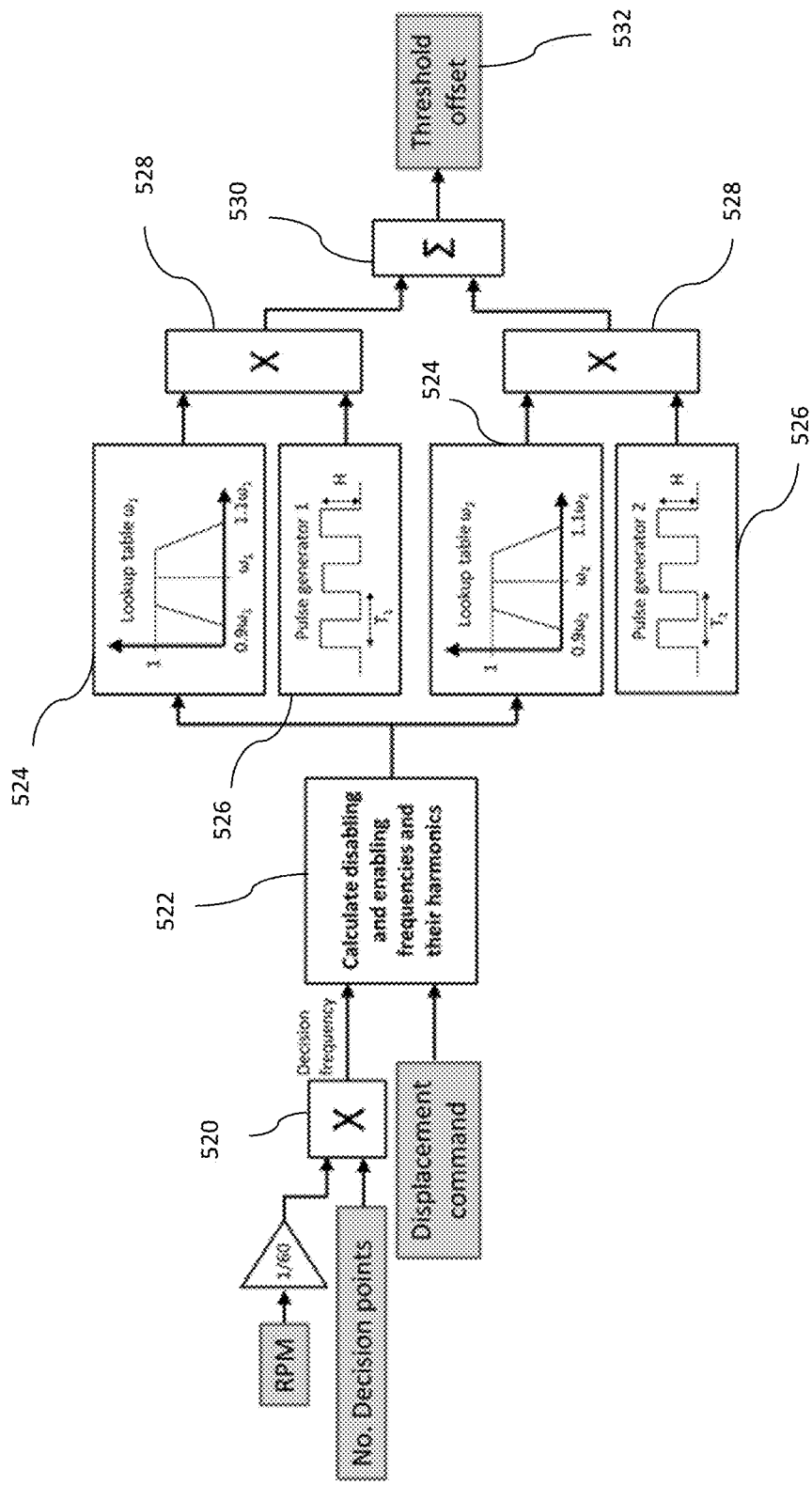
FIG. 13 is a schematic diagram of control logic for modifying the decision threshold according to the invention.

FIG. 13 is a schematic diagram of control logic for modifying the decision threshold according to an embodiment of the invention. The frequency of the decisions as to whether to enable or disable the cylinder is calculated 520 by multiplying the number of decision points per complete rotation of the rotatable shaft (which depends on the number of cylinders, and the extent to which there are cylinders which have the same phase throughout cycles of cylinder working volume, and therefore share a decision point) and the speed of rotation of the rotatable shaft (shown in FIG. 13 as the revolutions per minute divided by 60). The fundamental frequency of the selection of cylinders to undergo active cycles, and the selection of cylinders to undergo inactive cycles, and the frequency of relevant harmonics are then calculated 522. These frequencies correspond to the frequencies of intensity peaks. The resulting frequencies are then used to look up a plurality of look up tables 524, one of which is associated with each band of undesirable frequencies. The look up tables are window functions that have a centre frequency which is approximately equal to the relevant undesirable frequency. The output, from the look up table, which ranges from 0 to 1, is multiplied by a square wave pulse sequence 526 having a frequency which is a fraction (less than 0.5) of the relevant resonant frequency by a multiplier 528. The products are summed by an adder 530 thereby calculating a threshold offset 532. The threshold offset is used in step 312 of FIG. 5, and SUM is compared with the default threshold plus the time varying threshold offset. If SUM is greater than or equal to the default threshold plus the threshold offset, then a cylinder is selected to undergo an active cycle. Otherwise, the cylinder undergoes an inactive cycle 316. The procedure of FIG. 5 then continues as before.

The net effect of the control logic of FIG. 13, is that when one of the calculated frequencies falls within a band, on either side of undesirable resonant frequency of a portion of the machine in which the hydraulic transmission is fitted (and/or a portion of the hydraulic transmission itself), the pattern of active and inactive cycles of cylinder working volume is modified to remove intensity peaks at the resonant frequency (the second procedure), but the displacement determination algorithm of FIGS. 5 and 6 is employed when none of the calculated frequencies fall within an undesirable frequency band.

Figure 15:
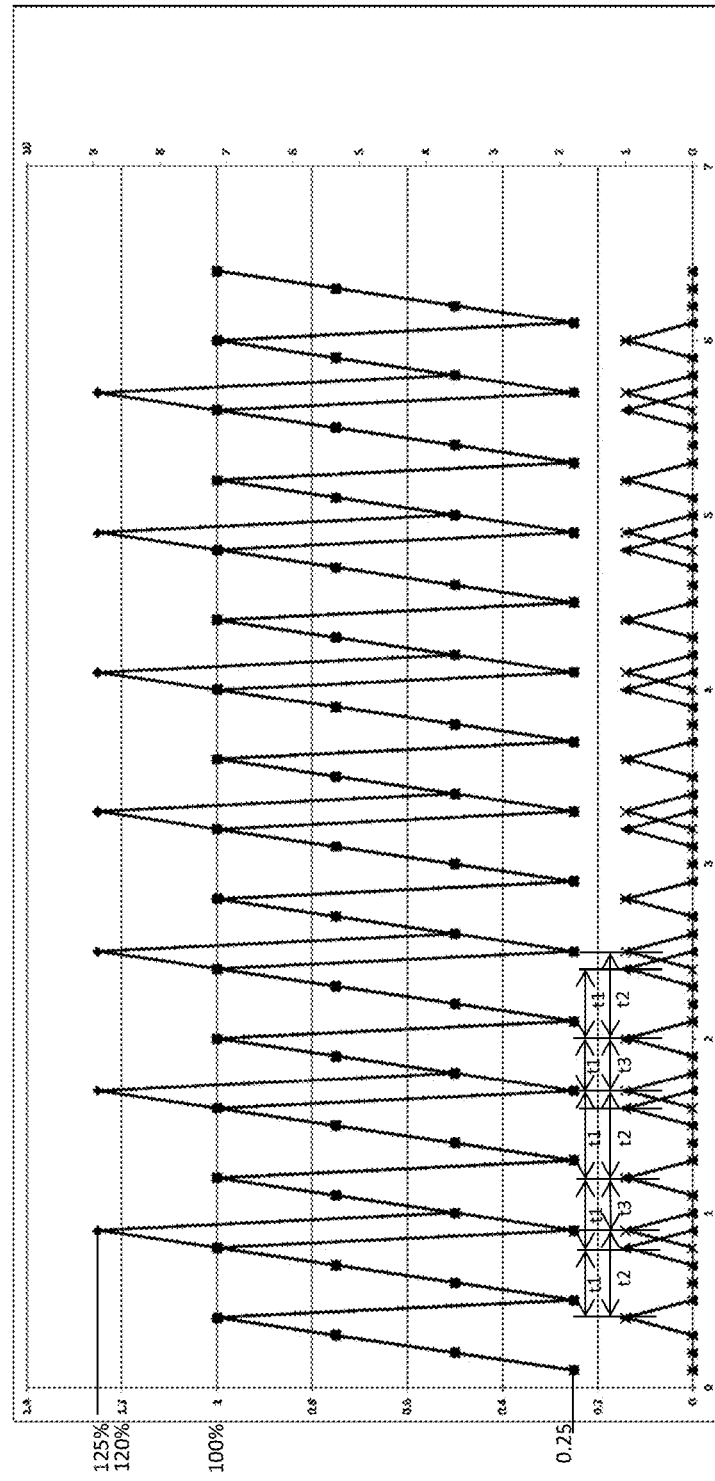
FIG. 15 is a graph showing the values of ACCUMULATOR after successive decision points.

FIG. 14 shows the resulting modified cylinder selection pattern using the same parameters as FIG. 6. It can be seen that some selections of an active cycle are retarded, and some are advanced. The same pattern of standard and modified selection of active cylinders is shown in a different format in FIG. 15. In FIG. 15, T1 is the period of time between the selection of active cycles without threshold modification. T2 and T3 are the period of time between the selection of active cycles with the threshold modification.

Figure 16:
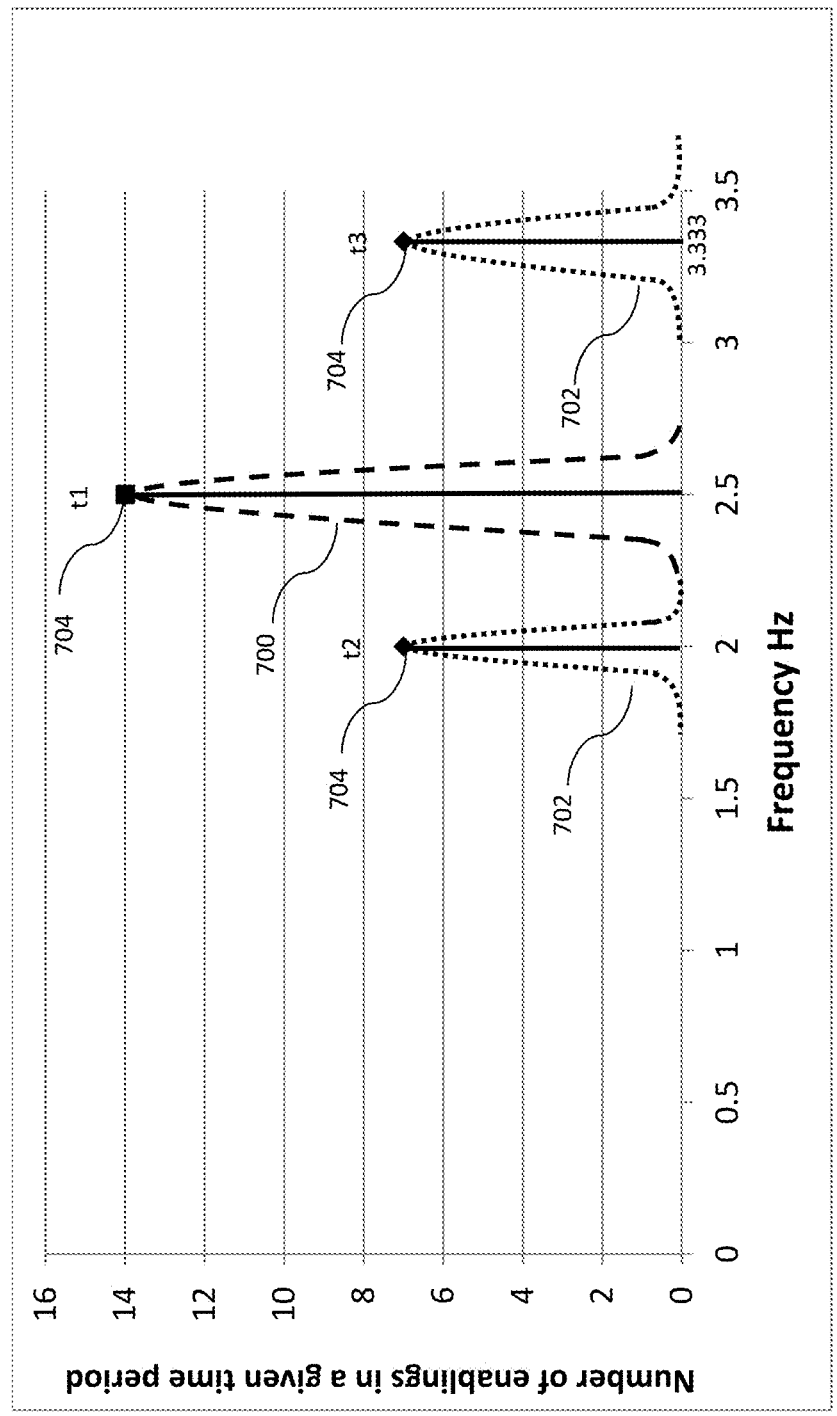
FIG. 16 illustrates the effect of the threshold modulation on the frequency spectrum of the pattern of active and inactive cycles of cylinder working volume carried out by the cylinders of a pump or motor.

FIG. 16 further illustrates the frequency of intensity peaks 704 arising in the frequency spectrum 700, 702 arising from the unmodified pattern of FIG. 6 (dashed lines, 700), and the modified pattern of FIGS. 14 and 15 (dotted lines, 702). In the unmodified pattern, the selection of active cylinders and separated by 0.4 ms leading to an intensity peak 704 at 2.5 Hz. In the frequency spectrum (dotted lines) arising from the modified pattern, there are intensity peaks 704 at 2 and 3.333 Hz. Accordingly, the addition of the pulsed wave form has removed an unwanted intensity peak in the frequency spectrum. However, the total net displacement averaged over time has not been changed.

In these examples, the decision threshold has been modified by the application of a square wave pulse. However, it is not essential that any modulation is by a square wave, or even by a repeating pattern. Furthermore, in alternative embodiments, rather than modifying the decision threshold, one of the received inputs to the pump or motor, typically the displacement demand is instead modified, by the addition of a periodic offset wave form, in the same way that the threshold is modified in the above example. This has a corresponding effect.

Figure 17:
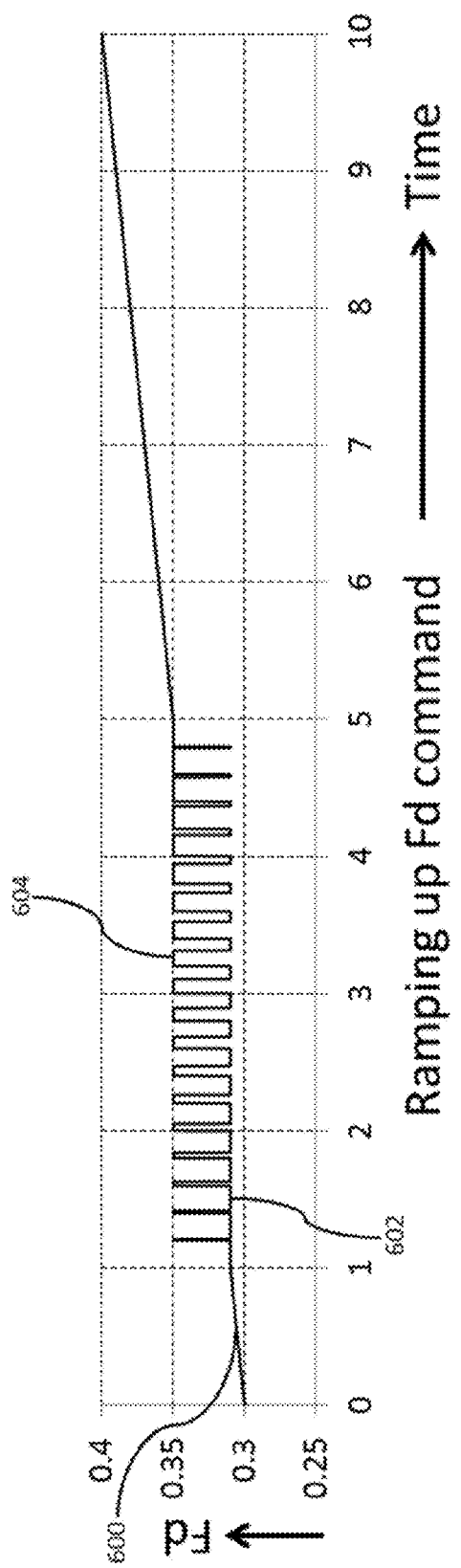
FIG. 17 illustrates a modified displacement demand signal in accordance with an embodiment of the invention.

FIG. 17 illustrates a way in which this may be achieved. In this example, the received displacement demand signal 600 for the pump which is generated by the procedure of FIG. 4 increases linearly from time 0. It is determined that, for a given speed of rotation of the rotatable shaft of the pump, when the displacement demand signal is between 0.31 and 0.35, the displacement determination algorithm would generate patterns of active and inactive cycles of cylinder working volume having intensity peaks at undesirable frequencies. When the received displacement demand signal is between 0.31 and 0.35, the displacement demand is alternated between a lower value 602 or 0.31 and a high value 604 of 0.35. The modified displacement demand signal therefore alternates between a lower value and a higher value with a duty cycle selected such that the mean value of the displacement demand signal is unchanged. This can be achieved by using a duty, D=(received displacement demand signal−low value)/(high value−low value)

In general, the sequence of selection of active and inactive cycles of cylinder working volume will vary with the speed of rotation of the rotatable shaft for a given displacement demand, expressed as a fraction of maximum displacement per revolution of the rotatable shaft, to suppress the generation of vibrations at one or more resonant frequencies of one or more components of the hydraulic transmission or a wind turbine generator, or other machine including the hydraulic transmission.

Although in the examples of FIGS. 8 and 9, the ranges of undesirable frequencies were constant and independent of the speed of rotation of the rotatable shaft, in some embodiment, one or more of the ranges of undesirable frequencies will be variable. For example, in the case of the hydraulic motor being used to drive an actuated arm of an excavator, a resonant frequency (and so the range of undesirable frequencies centred on the resonant frequency) may depend on the position of the arm. If the motor drives a ram, a resonant frequency (and so the range of undesirable frequencies centred on the resonant frequency) will depend on the extent to which the ram is extended. In some cases, one or more of the resonant frequencies (and therefore one or more of the ranges of undesirable frequencies) will depend on one or more measured parameters which are independent of the speed of rotation of the rotatable shaft, for example, they may depend on the position of a plurality of actuators, as measured by one or more position sensors. In some cases, one or more of the resonant frequencies (and therefore one or more of the ranges of undesirable frequencies) will depend on, but not be proportional to, the speed of rotation of the rotatable shaft. For example, in the wind turbine generator, one or more resonant frequencies of the blades (and therefore one or more of the ranges of undesirable frequencies) will increase as the speed of rotation of the rotatable shaft increases (and so the blades become more stiff) but the change in frequency is not proportional to the rate of rotation of the rotatable shaft.

In some cases, all of the ranges of undesirable frequencies are fixed and can be stored in memory. However, in when one or more resonant frequencies may vary, a resonance determining module 159 may be employed to determine one or more of the ranges of undesirable frequencies comprising varying resonant frequencies. The resonance determining module may therefore process data from one or more sensors (e.g. one or more accelerometers, pressure sensors, strain gauges, actuator position sensors etc.). As mentioned above, in some but not all cases, the resonance determining module will take into account the speed of rotation of the rotatable shaft. The resonance determining module might use a look up table, or algorithm to determine resonant frequencies and/or range of undesirable frequencies from the one or more measurements from sensors.

The resonance determining module might be operable to identify one or more resonant oscillations by analysing a signal (e.g. the speed of rotation of the rotatable shaft, the pressure in the high pressure fluid line, the signal from an accelerometer or strain gauge) and carry out a frequency analysis to identify a resonance. For example, the resonance determining module might carry out Fast Fourier Transform analysis on the signal from an accelerometer or strain gauge attached to a part of a wind turbine generator (e.g. to the tower, hub or a blade) and identify intensity peaks in the resulting frequency spectrum. Once one or more frequencies have been identified, the resonance determining module can then define a said range of undesirable frequencies around the identified resonance.

Figure 18:
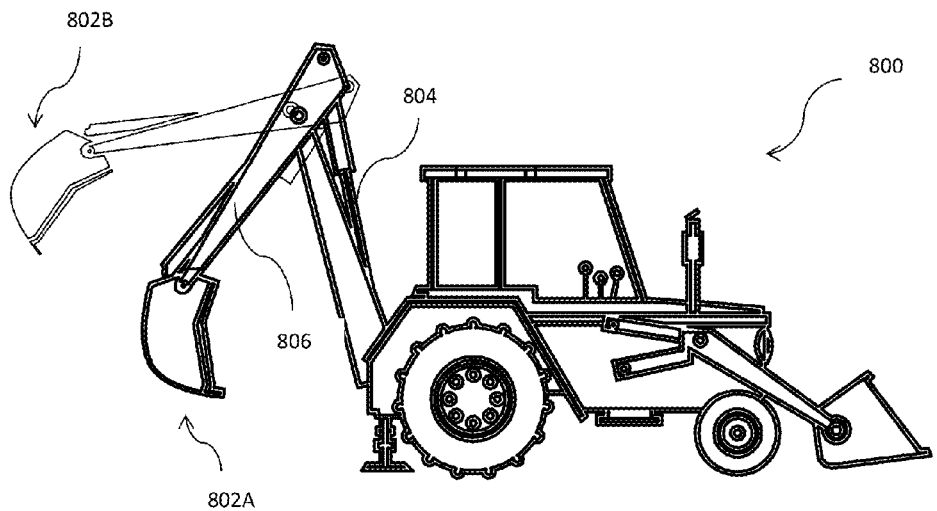
FIG. 18 is a schematic diagram of a hydraulic excavator.

For example, FIG. 18 shows an excavator 800 having a hydraulically actuated arm, shown in two positions 802A and 802B, formed from jointed first and second arm portions 804, 806. Each of the first and second arm portions can be independently actuated by a hydraulic motor (e.g. a ram) which is part of a hydraulic transmission according to the invention. The excavator arm could have one or more resonant modes which have a frequency which depends on both the position of the first arm and the position of the second arm, and which is independent of the speed of rotation of the rotatable shaft of the pump and motor of the hydraulic transmission. These frequencies can be calculated from the positions of the first and second arms, measured by position sensors.

Figure 19:
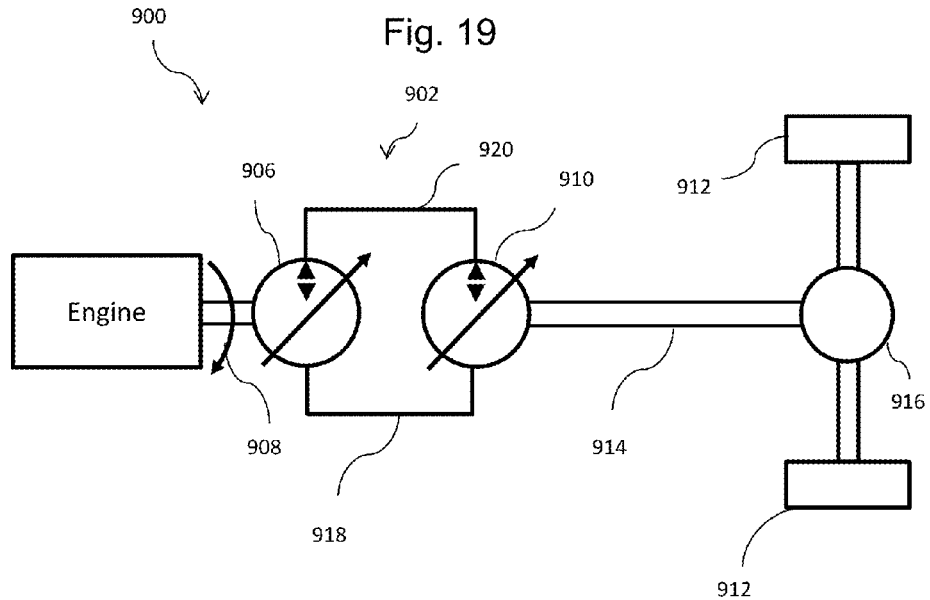
FIG. 19 is a schematic diagram of a vehicle transmission.

FIG. 19 is an example of the invention applied to a vehicle 900 having a hydraulic transmission 902. An engine 904 which drives a hydraulic variable displacement pump 906, of the type described above, through a drive shaft 908 and a hydraulic variable displacement motor 910, of the type described above, which drives wheels 912 through a drive shaft 914 (coupled to the rotatable shaft of the motor) and differential 916. The hydraulic transmission also includes a low pressure working fluid line 918 and a high pressure working fluid line 920. The drive shafts, particularly the shaft 914 driven by the hydraulic motor, may suffer resonant oscillations if the applied torque oscillates at certain frequencies. Some of these resonance modes will be at constant frequency, irrespective of the speed of rotation of the rotatable shaft of the motor, and some may vary with the speed of rotation of the rotatable shaft. Again, the frequency of these resonances can be calculated and generation of a pattern of active and inactive cycles of cylinder working volume having a frequency spectrum with an intensity peak within these ranges of undesirable frequencies extending to either side of these resonant frequencies can be avoided. Further variations and modifications may be made within the scope of the invention herein disclosed.

LIST OF FEATURES

1 Wind turbine generator
2 Nacelle
4 Tower
6 Turbine
8 Blades
10 Hydraulic transmission
12 Hydraulic variable displacement pump
14 Drive shaft
16 Hydraulic variable displacement motor
18 Electricity generator
20 Generator drive shaft
22 Contactor
24 Tank
26 Low pressure working fluid line
28 High pressure working fluid line
30 Oleo-pneumatic accumulator
32 Transmission controller
34 Anemometer
36 Accelerometer
38 Accelerometer
40 Processor
42 Data storage 100 Cylinders
102 Cylinder working volume
106 Pistons
108 Rotatable shaft
110 Eccentric cam
112 Shaft position and speed sensor
114 Signal line
116 Machine controller
118 Low pressure valves (electronically controlled valves)
120 Low pressure manifold
122 High pressure manifold
124 Low pressure valve control line
126 High pressure valves (electronically controlled valves)
128 Pressure relief valve
132 High pressure valve control line
150 Processor
152 Bus
154 Memory
156 Input-output port
158 Program
159 Resonance determining module
160 Variables (including ERROR)
162 Database of data concerning each cylinder
163 Data concerning angular position of each cylinder
164 Data concerning whether each cylinder is disabled
165 Data being number of times each cylinder has undergone an active cycle
166 Shaft position signal
168 Measurement of pressure
200 Step of receiving input signals
202 Step of determining target torque
204 Step of calculating pump displacement
206 Step of calculating motor displacement
300 Step of procedure beginning
302 Step of setting ACCUMULATOR to zero
304 Step of reaching decision point
306 Step of reading request motor displacement
308 Step of calculating SUM
310 Step of checking status
312 Comparison step
314 Step of setting displacement
316 Step of setting displacement to zero
318 Step of updating ACCUMULATOR
350 Sigma block (summer)
352 Software ACCUMULATOR
354 Comparator
356 Enable cylinder signal
358 Amplifier
400 Fundamental frequency of selection of cylinders to carry out active cycles
401 Harmonic frequency of selection of cylinders to carry out active cycles
402 Frequency of selection of cylinders to carry out inactive cycles
403 Harmonic frequency of selection of cylinders to carry out inactive cycles
404 Resonant frequency of tower
406 Frequency band
408 Resonant frequency of blades
410 Frequency band
450 Frequency spectrum of pattern of active and inactive cycles of cylinder working volume
452 Intensity peak due to fundamental frequency of active cycles (also E1)
454 Intensity peak due to fundamental frequency of inactive cycles (also D1)
456 Intensity peak due to harmonic
500 Step of receiving displacement demand
502 Step of calculating frequency of components
504 Comparison step
506 Decision step
508 Comparison using unmodified threshold
510 Comparison using modified threshold
520 Calculating decision frequency
522 Calculating frequencies
524 Lookup tables
526 Pulse generators
528 Multipliers
530 Adder
532 Threshold offset
T1 Period of time between active cycles by first procedure
T2, T3 Period of time between successive active cycles by second procedure
600 Received displacement demand signal
602 Lower value
604 Higher value
700 Frequency spectrum (unmodified pattern)
702 Frequency spectrum (modified pattern)
704 Intensity peak of frequency spectrum
800 Excavator
802A, 802B Hydraulically actuated arm in two positions
804 First arm portion
806 Second arm portion 900 Vehicle
902 Hydraulic transmission
904 Engine
906 Variable displacement hydraulic pump
908 Pump drive shaft
910 Variable displacement hydraulic motor
912 Wheels
914 Motor drive shaft
916 Differential
918 Low pressure working fluid line
920 High pressure working fluid line

The invention claimed is:

1. A hydraulic pump or motor comprising:
a rotatable shaft,
a shaft sensor which measures the position or speed of rotation of the rotatable shaft,
at least one cam having at least one lobe,
a plurality of cylinders having working volumes which vary cyclically with rotation of the rotatable shaft,
a low pressure working fluid line and a high pressure working fluid line,
a plurality of valves regulating the flow of working fluid between each cylinder and the low and high pressure working fluid lines, at least one said valve associated with each cylinder being an electronically controlled valve,
wherein the hydraulic pump or motor comprises a valve control module configured to generate command signals to actively control the said electronically controlled valves in phased relationship to cycles of cylinder working volume, to thereby determine whether each cylinder carries out an active cycle in which there is a net displacement of working fluid or an inactive cycle in which there is no net displacement of working fluid, for each cycle of cylinder volume,
the valve control module having a demand input which receives a displacement demand signal representative of a target net displacement of working fluid by the plurality of cylinders,
wherein the valve control module is configured to generate said command signals so that the time averaged net displacement of the plurality of cylinders meets the displacement demand represented by the displacement demand signal, while selecting the pattern of command signals so that the frequency of one or more intensity peaks of the frequency spectrum of the pattern of active and inactive cycles of cylinder working volume carried out by the cylinders do not remain within one or more ranges of undesirable frequencies, taking into account the speed of rotation of the rotatable shaft.

2. A hydraulic pump or motor according to claim 1, wherein the said frequency of one or more intensity peaks comprises the fundamental frequency of cylinders carrying out active cycles, or a harmonic thereof, or the fundamental frequency of cylinders carrying out inactive cycles, or a harmonic thereof.

3. A hydraulic pump or motor according to claim 1, wherein the valve control module is configured to execute a displacement determination algorithm at each of a plurality of time steps to process the displacement demand signal and the net displacement of working fluid during previous cycles of cylinder working volume and to cause at least one said cylinder to undergo an active cycle in which it makes a net displacement of working fluid when the difference between the total amount of working fluid which has been displaced and the total amount of working fluid which has been demanded, exceeds a threshold.

4. A hydraulic pump or motor according to claim 3, wherein the valve control module is configured to vary the threshold to thereby reduce the intensity of one or more undesirable frequency components of the pattern of active and inactive cycles of cylinder working volume of the one or more said cylinders.

5. A hydraulic pump or motor according to claim 4, wherein the threshold is alternately raised and lowered to reduce the intensity of one or more said undesirable frequency components.

6. A fluid working machine according to claim 5, wherein the threshold is alternately raised and lowered at a frequency between half and one tenth of the frequency of an undesirable frequency within a said range of undesirable frequencies within which at least one intensity peak of the frequency spectrum would otherwise fall.

7. A fluid working machine according to claim 4, wherein the valve control module receives a rotatable shaft speed signal and is configured to take into account the rotatable shaft speed signal when determining whether the threshold should be varied.

8. A fluid working machine according to claim 1, wherein the displacement demand signal received by the valve control module is selectively modulated so that the frequency of one or more said intensity peaks of the frequency spectrum does not remain within one or more said ranges of undesirable frequencies.

9. A fluid working machine according to claim 8, wherein the displacement demand signal is selectively modulated by a periodic modulation waveform.

10. A hydraulic pump or motor according to claim 3, wherein the valve control module comprises an accumulator which stores an accumulated displacement error value and an adder which at each time step adds the displacement demand represented by the displacement demand signal to the accumulated displacement error value and a subtractor which subtracts a value representative of the amount of working fluid which has been displaced under the active control of the valve control module on the same or the previous time step.

11. A hydraulic pump or motor according to claim 1, wherein the valve control module comprises a frequency determination module which determines the frequency of one or more intensity peaks of the frequency spectrum of the pattern of active and inactive cycles of cylinder working volume which would be generated if the valve control module selected the pattern of active and inactive cycles of cylinder working volume using a first procedure, taking into account the displacement demand and the speed of rotation of the rotatable shaft, and compares the determined one or more frequencies with one or more range of undesirable frequencies, and if at least one determined frequency falls within at least one range of undesirable frequencies, normally causes the pattern of active and inactive cycles of cylinder working volume to be selected using a second procedure instead of the first procedure, thereby reducing the intensity of said frequency spectrum in at least one said range of frequencies.

12. A hydraulic pump or motor according to claim 1, comprising a resonance determining module which determines one or more of the ranges of undesirable frequencies in dependence on one or more measured parameters.

13. A hydraulic pump or motor according to claim 1, comprising a resonance determining module which is operable to determine one or more of the ranges of undesirable frequencies by analyzing a signal to identify one or more oscillations, and to identify the resonant frequency of the one or more oscillations, and to set one or more ranges of undesirable frequencies to include the determined one or more frequencies.

14. A hydraulic pump or motor according to claim 12, wherein the resonance determining module determines one or more of the ranges of undesirable frequencies in dependence on one or more measured parameters which are independent of the speed of rotation of the rotatable shaft.

15. A hydraulic pump or motor according to claim 1, wherein at least some of the undesirable frequency components include resonant frequencies of at least one component of a or a machine including the hydraulic transmission.

16. A hydraulic transmission comprising
  a variable displacement hydraulic pump,
  a variable displacement hydraulic motor,
  a drive shaft coupled to the hydraulic pump, for driving the hydraulic pump, and
  an output shaft coupled to the hydraulic motor, for coupling to a load,
  wherein at least one of the hydraulic pump and the hydraulic motor is a hydraulic pump or motor according to claim 1.

17. A wind turbine generator comprising a hydraulic transmission according to claim 16, a turbine coupled to the hydraulic pump and comprising a plurality of blades, and an electricity generator coupled to the hydraulic motor.

18. A method of operating a hydraulic pump or motor, the hydraulic pump or motor comprising:
  a rotatable shaft,
  a shaft sensor which measures the position or speed of rotation of the rotatable shaft,
  at least one cam having at least one lobe,
  a plurality of cylinders having working volumes which vary cyclically with rotation of the rotatable shaft,
  a low pressure working fluid line and a high pressure working fluid line,
  a plurality of valves regulating the flow of working fluid between each cylinder and the low and high pressure working fluid lines, at least one said valve associated with each cylinder being an electronically controlled valve, the method comprising receiving a displacement demand signal representative of a target displacement of working fluid by the plurality of cylinders, and generating command signals to actively control the said electronically controlled valves in phased relationship to cycles of cylinder working volume, to thereby determine whether each cylinder carries out an active cycle in which there is a net displacement of working fluid or an inactive cycle in which there is no net displacement of working fluid, for each cycle of cylinder volume, wherein the command signals are selected so that the time averaged net displacement of the plurality of cylinders meets the displacement demand represented by the displacement demand signal, while the pattern of command signals so that the frequency of one or more intensity peaks of the frequency spectrum of the pattern of active and inactive cycles of cylinder working volume carried out by the cylinders does not remain within one or more ranges of undesirable frequencies, taking into account the speed of rotation of the rotatable shaft.

* * * * *